(12) United States Patent
Jo

(10) Patent No.: US 7,942,547 B2
(45) Date of Patent: May 17, 2011

(54) LIGHT EMITTING DEVICE AND ELECTRONIC APPARATUS

(75) Inventor: Hiroaki Jo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 259 days.

(21) Appl. No.: 12/326,492

(22) Filed: Dec. 2, 2008

(65) Prior Publication Data

US 2009/0147512 A1 Jun. 11, 2009

(30) Foreign Application Priority Data

Dec. 7, 2007 (JP) ................................ 2007-316656
Oct. 30, 2008 (JP) ................................ 2008-279324

(51) Int. Cl.
*F21V 11/00* (2006.01)
(52) U.S. Cl. ................... 362/240; 362/249.02; 362/237; 362/244
(58) Field of Classification Search ................... 362/240, 362/237, 238, 248, 249.02; 399/4
See application file for complete search history.

(56) References Cited

U.S. PATENT DOCUMENTS

| 5,962,874 A | * | 10/1999 | Masuda et al. | 257/98 |
| 6,687,028 B1 | * | 2/2004 | Kasahara et al. | 358/509 |
| 7,300,177 B2 | * | 11/2007 | Conner | 362/244 |
| 7,478,925 B2 | * | 1/2009 | Hiyama et al. | 362/249.02 |
| 2002/0039222 A1 | * | 4/2002 | Hayashi | 359/204 |
| 2004/0247335 A1 | * | 12/2004 | Inoue et al. | 399/69 |
| 2008/0259241 A1 | * | 10/2008 | Morimoto | 349/62 |

FOREIGN PATENT DOCUMENTS

JP A-2005-096259 4/2005

* cited by examiner

*Primary Examiner* — Evan Dzierzynski
(74) *Attorney, Agent, or Firm* — Oliff & Berridge PLC

(57) ABSTRACT

A light emitting device includes a plurality of light emitting elements aligned along a reference line, a plurality of lenses that collects light emitted from the plurality of light emitting elements, and a drive circuit that allows either a first light emitting element or a second light emitting element to emit light. The plurality of lenses includes a first lens and a second lens that is disposed on an opposite side of the first lens with the reference line interposed therebetween, and a distance between the center of the first lens and the reference line is the same as a distance between the center of the second lens and the reference line. The plurality of light emitting elements includes the first light emitting element and the second light emitting element that is disposed on an opposite side of the first light emitting element with the reference line interposed therebetween. A distance between the first light emitting element and the reference line is the same as a distance between the second light emitting element and the reference line.

5 Claims, 18 Drawing Sheets

LIGHT EMITTING DEVICE AND ELECTRONIC APPARATUS

BACKGROUND

1. Technical Field

The present invention relates to a light emitting device using a light emitting element and an electronic apparatus.

2. Related Art

For example, in image forming apparatuses of a xerographic type, as an optical head that is used for forming an electrostatic latent image in an image carrier such as a photosensitive drum, a light emitting device in which a plurality of light emitting elements is disposed on a substrate is used. In JP-A-2005-96259, technology in which a plurality of rows of light emitting lines formed by disposing a plurality of light emitting elements along the main scanning direction is disposed and the light emitting line that is actually used for exposure of the image carrier is switched in a predetermined condition has been disclosed.

The light emitted from the light emitting elements belonging to the light emitting line is collected by using a lens array and reaches an exposure surface of the image carrier. For example, when positional relationship of each light emitting element belonging to the used light emitting line and the lens array is different in a case where one light emitting line among a plurality of the light emitting lines is used and a case where another light emitting line is used, the shape of an image formed on the exposure surface of the image carrier changes.

In addition, in JP-A-2005-96259, each light emitting line is configured by an element group of one row in which a plurality of light emitting elements is arranged in the main scanning direction. A predetermined gap is needed to be acquired between the light emitting elements belonging to the light emitting line, and accordingly, it is difficult to sufficiently form an image under the configuration disclosed in JP-A-2005-96259 in a case where a high resolution is required.

SUMMARY

An advantage of some aspects of the invention is that it provides technology for improving the quality of light exposure of a light emitting device that uses a light emitting element.

According to a first aspect of the invention, there is provided a light emitting device including: a plurality of light emitting elements aligned along a reference line; a plurality of lenses that collects light emitted from the plurality of light emitting elements; and a drive circuit that allows either a first light emitting element or a second light emitting element to emit light. The plurality of lenses includes: a first lens; and a second lens that is disposed on an opposite side of the first lens with the reference line interposed therebetween. In addition, a distance between the center of the first lens and the reference line is the same as a distance between the center of the second lens and the reference line. The plurality of light emitting elements includes: the first light emitting element; and the second light emitting element that is disposed on an opposite side of the first light emitting element with the reference line interposed therebetween. In addition, a distance (for example, D1 shown in FIG. 4) between the first light emitting element (for example, one light emitting element E belonging to the element group G1 shown in FIG. 4) and the reference line is the same as a distance (for example, D2 shown in FIG. 4) between the second light emitting element (for example, one light emitting element E belonging to the element group G2 shown in FIG. 4) and the reference line.

In the light emitting device, it may be configured that a first element group and a second element group that respectively include a plurality of light emitting elements arranged in a first direction are disposed in parallel with each other in a second direction that is different from the first direction and a driver unit that allows either the first element group or the second element group to emit light is included. A first lens group and a second lens group respectively including a plurality of lenses that is disposed in the first direction and collects light emitted from the light emitting elements are disposed in parallel with each other in the second direction, the first element group is disposed on one side in the section direction, viewed from a reference line that has a same distance in the second direction to a first line that passes through the center of each lens of the first lens group and extends in the first direction and to a second line that passes through the center of each lens of the second lens group and extends in the first direction, and the second element group is disposed on the other side of the second direction, viewed from the reference line. In addition, a first distance that is the distance between the reference line and the light emitting element of the first element group in the second direction is the same as the distance between the reference line and the light emitting element of the second element group in the second direction.

In the above-described aspect, the distance between the reference line and the light emitting element of the first element group in the second direction is the same as the distance between the reference line and the light emitting element of the second element group in the second direction. Accordingly, the form of an area (hereinafter, referred to as an exposure spot), in which light emitted from the light emitting element belonging to the first element group reaches an exposure surface of an image carrier by being transmitted through the lens and the form of each exposure spot that is formed on the exposure surface of the image carrier by emission of each light emitting element belonging to the second element group, can be uniform. Therefore, non-uniformity of the quality of light exposure for a case where the first element group emits light and a case where the second element group emits light can be suppressed.

In the above-described light emitting device, the plurality of light emitting elements may further include: a third light emitting element (for example one light emitting element E belonging to the element group G3 shown in FIG. 5) disposed on a side that is the same as that of the first light emitting element, viewed from the reference line; and a fourth light emitting element (for example one light emitting element E belonging to the element group G4 shown in FIG. 5) disposed on a side that is the same as that of the second light emitting element, viewed from the reference line. In addition, the first light emitting element and the third light emitting element are disposed in different positions in the direction (for example, direction X shown in FIG. 5) in which the reference line extends, and the second light emitting element and the fourth light emitting element are disposed in different positions in the direction in which the reference line extends. In addition, a distance (for example, D3 shown in FIG. 5) between the reference line and the third light emitting element is the same as a distance (for example, D4 shown in FIG. 5) between the reference line and the fourth light emitting element and is different from the distance (for example D1=D2 shown in FIG. 5) between the reference line and the first light emitting element. The drive circuit allows the light emitting elements belonging to one light emitting line between a first light emitting line including the first light emitting element and the third light emitting element and a second light emitting line including the second light emitting element and the fourth light emitting element to emit light.

In addition, it may be configured that the above-described light emitting device further includes a third element group and a fourth element group that respectively include a plurality of light emitting elements arranged in the first direction, the third element group is disposed on one side of the second direction viewed from the reference line, the fourth element group is disposed on the other side of the second direction viewed from the reference line, each light emitting element belonging to the first element group and each light emitting element belonging to the third element group are disposed in different positions in the first direction, and each light emitting element belonging to the second element group and each light emitting element belonging to the fourth element group are disposed in different positions in the first direction. In such a case, a second distance that is a distance between the reference line and the light emitting element of the third element group in the second direction is the same as a distance between the reference line and the light emitting element of the fourth element group in the second direction and is different from the first distance, and the driver unit drives the light emitting elements belonging to one light emitting line between a first light emitting line including the first element group and the third element group and a second light emitting line including the second element group and the fourth element group.

In such a case, each light emitting element belonging to the first element group, each light emitting element belonging to the third element group, each light emitting element belonging to the second element group, and each light emitting element belonging to the fourth element group are disposed in different positions in the first direction. Accordingly, a high-definition image (latent image) can be formed on the image carrier by the light emitting device. In addition, non-uniformity of the quality of light exposure in a case where the first light emitting line emits light and a case where the second light emitting line emits light can be suppressed.

According to a second aspect of the invention, there is provided a light emitting device including: a plurality of light emitting elements aligned along a reference line; and a plurality of lenses that collects light emitted from the plurality of light emitting elements. The plurality of lenses includes: a first lens; and a second lens that is disposed on an opposite side of the first lens with the reference line interposed therebetween. A distance between the center of the first lens and the reference line is the same as a distance between the center of the second lens and the reference line. The plurality of light emitting elements includes: a first light emitting element (for example, one light emitting element E belonging to the element group G1 shown in FIG. 7); a second light emitting element (for example, one light emitting element E belonging to the element group G2 shown in FIG. 7) that is disposed on an opposite side of the first light emitting element with the reference line interposed therebetween; a third light emitting element (for example, one light emitting element E belonging to the element group G3 shown in FIG. 7) that is disposed on a side that is the same as that of the first light emitting element, viewed from the reference line; and a fourth light emitting element (for example, one light emitting element E belonging to the element group G4 shown in FIG. 7) that is disposed on a side that is the same as that of the second light emitting element, viewed from the reference line. The first light emitting element and the third light emitting element are disposed on a side that is the same as that of the first lens, viewed from the reference line, and the second light emitting element and the fourth light emitting element are disposed on a side that is the same as that of the second lens, viewed from the reference line. The first light emitting element and the second light emitting element are disposed in different positions in the direction in which the reference line extends, and the third light emitting element and the fourth light emitting element are disposed in different positions in the direction in which the reference line extends. A distance (for example, D1 shown in FIG. 7) between the reference line and the first light emitting element is the same as a distance (for example, D2 shown in FIG. 7) between the reference line and the second light emitting element. The first light emitting element is disposed in a position that is closer to a first line (for example line La1 shown in FIG. 7) passing though the center of the first lens and extending along the reference line than the third light emitting element, and the second light emitting element is disposed in a position that is closer to a second line (for example line La2 shown in FIG. 7) passing though the center of the second lens and extending along the reference line than the fourth light emitting element. A drive circuit allows the light emitting elements belonging to one light emitting line between a first light emitting line including the first light emitting element and the second light emitting element and a second light emitting line including the third light emitting element and the fourth light emitting element to emit light.

In the above-described light emitting device, it may be configured that a first element group, a second element group, a third element group, and a fourth element group that respectively include a plurality of light emitting elements are arranged in parallel with one another in a second direction that is different from the first direction, a driver unit that drives the light emitting elements belonging to one light emitting line between a first light emitting line including the first element group and the second element group and a second light emitting line including the third element group and the fourth element group is included, and a first lens group and a second lens group that respectively include a plurality of lenses that are disposed along the first direction and collects light emitted from the light emitting elements are disposed in parallel with each other in the second direction. In such a case, the first element group and the third element group are disposed on one side of the second direction, viewed from a reference line that has a same distance from a first line that passes through the center of each lens of the first lens group and extends in the first direction and from a second line that passes through the center of each lens of the second lens group and extends in the first direction, and the second element group and the fourth element group are disposed on the other side of the second direction, viewed from the reference line. In such a case, each light emitting element belonging to the first element group and each light emitting element belonging to the second element group are disposed in different positions in the first direction, and each light emitting element belonging to the third element group and each light emitting element belonging to the fourth element group are disposed in different positions in the first direction. In addition, a distance between the reference line and the light emitting element of the first element group in the second direction is the same as a distance between the reference line and the light emitting element of the second element group in the second direction. In addition, each light emitting element belonging to the first element group is disposed in a position closer to the first line than each light emitting element belonging to the third element group, and each light emitting element belonging to the second element group is disposed in a position closer to the second line than each light emitting element belonging to the fourth element group.

In such a case, each light emitting element belonging to the first light emitting line is disposed in a position closer to the center line of the lens than each light emitting element belonging to the second light emitting line. Accordingly, each exposure spot formed by the first light emitting line is in a relatively even shape (precise circle), compared to each exposure spot formed by the second light emitting line. In addition, each light emitting element belonging to the first element group and each light emitting element belonging to the second element group are disposed in different positions in the first direction. Accordingly, a high-definition image (latent image) can be formed on the image carrier by the light emitting device. Thus, when the first light emitting line is used, a high-definition image (latent image) can be formed with having each exposure spot formed on the exposure surface of the image carrier in a uniformly even shape. In this case, it is appropriate that the first light emitting line is used for a mode requiring a high resolution and the second light emitting line is used for a case not requiring a high resolution.

In the above-described light emitting device, it may be configured that the plurality of light emitting elements further includes: a third light emitting element (for example one light emitting element E belonging to the element group G3 shown in FIG. 8) disposed on a side that is the same as that of the first light emitting element, viewed from the reference line; and a fourth light emitting element (for example one light emitting element E belonging to the element group G4 shown in FIG. 8) disposed on a side that is the same as that of the second light emitting element, viewed from the reference line. In such a case, the first light emitting element and the fourth light emitting element are disposed in different positions in the direction in which the reference line extends, and the second light emitting element and the third light emitting element are disposed in different positions in the direction in which the reference line extends. In this case, a distance (for example, D3 shown in FIG. 8) between the reference line and the third light emitting element is the same as a distance (for example, D4 shown in FIG. 8) between the reference line and the fourth light emitting element and is different from the distance (for example D1=D2 shown in FIG. 8) between the reference line and the first light emitting element, and the drive circuit allows the light emitting elements belonging to one light emitting line between a first light emitting line including the first light emitting element and the fourth light emitting element and a second light emitting line including the second light emitting element and the third light emitting element to emit light.

In addition, it may be configured that the above-described light emitting device further includes a third element group and a fourth element group that respectively include a plurality of light emitting elements arranged in the first direction, the third element group is disposed on one side of the second direction viewed from the reference line, the fourth element group is disposed on the other side of the second direction viewed from the reference line. In such a case, the driver unit drives the light emitting elements belonging to one light emitting line between a first light emitting line including the first element group and the fourth element group and a second light emitting line including the second element group and the third element group, and each light emitting element belonging to the first element group and each light emitting element belonging to the fourth element group are disposed in different positions in the first direction, and each light emitting element belonging to the second element group and each light emitting element belonging to the third element group are disposed in different positions in the first direction. In this case, a second distance that is a distance between the reference line and the light emitting element of the third element group in the second direction is the same as a distance between the reference line and the light emitting element of the fourth element group in the second direction and is different from the first distance. According to the above-described light emitting device, a high-definition image (latent image) can be formed on the image carrier by the light emitting device. In addition, non-uniformity of the quality of light exposure in a case where the first light emitting line emits light and a case where the second light emitting line emits light can be suppressed.

According to a third aspect of the invention, there is provided a light emitting device in which a plurality of pairs each including a first light emitting element and a second light emitting element that are disposed in a second direction that is different from a first direction with a predetermined gap interposed therebetween is disposed in the first direction. The light emitting device includes a drive circuit that allows light emitting elements belonging to one light emitting line between a first light emitting line including the first light emitting element of each of the plurality of pairs and a second light emitting line including the second light emitting element of each of the plurality of pairs to emit light. A first lens group and a second lens group that respectively include a plurality of lenses that is disposed in the first direction and collects light emitted from the light emitting elements are disposed in parallel with each other in the second direction. In each odd pair of the plurality of pairs, the first light emitting element is disposed on one side of the second direction and the second light emitting element is disposed on the other side, viewed from a reference line that has a same distance in the second direction from a first line that passes through the center of each lens of the first lens group and extends in the first direction and from a second line that passes through the center of each lens of the second lens group and extends in the first direction, and, in each even pair of the plurality of pairs, the first light emitting element is disposed on the other side of the second direction, viewed from the reference line, and the second light emitting element is disposed on the one side.

According to the above-described light emitting device, each light emitting element belonging to the first light emitting line and each light emitting element belonging to the second light emitting line are disposed to be distributed in the second direction. Accordingly, the form of each exposure spot formed by the first light emitting line and the form of each exposure spot formed by the second light emitting line can be uniform. In addition, a total of distances between the first light emitting elements, for example, belonging to the first light emitting line and the reference line in the second direction and a total of distances between the second light emitting elements belonging to the second light emitting line and the reference line can be set to be the same.

In the above-described light emitting device, in each of the plurality of pairs that are adjacent in the first direction, positions of the light emitting elements in the second direction may be different from each other. In such a case, the light emitting elements belonging to each light emitting line can be arranged in a zigzag pattern, and accordingly, a high-definition image (latent image) formed on the image carrier by the light emitting device can be acquired by decreasing the distance of the light emitting elements in the first direction.

According to a fourth aspect of the invention, there is provided an electronic apparatus including the above-described light emitting device. The light emitting device according to an embodiment of the invention is used in various electronic apparatuses. A typical example of the electronic apparatus according to an embodiment of the invention is an image forming apparatus of a xerographic type using the above-described light emitting device for exposure of an image carrier such as a photosensitive drum. The image forming apparatus includes an image carrier in which a latent image is formed by exposure, the light emitting device according to an embodiment of the invention that exposes the image carrier, and a developing unit that forms an actual image by adding a developer (for example, toner) to the latent image formed on the image carrier.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
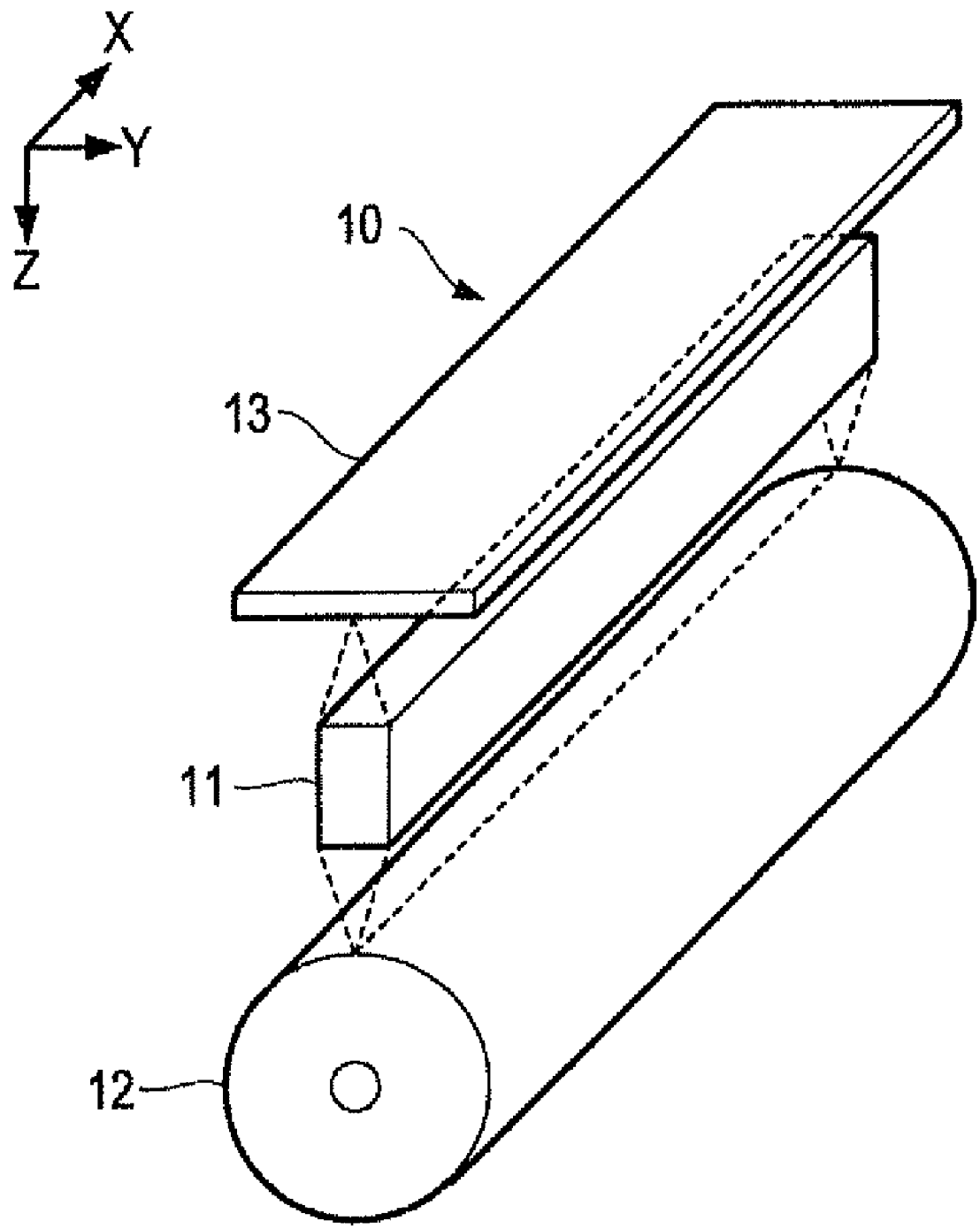
FIG. 1 is a perspective view showing a partial configuration of an image forming apparatus according to a first embodiment of the invention.

FIG. 1 is a perspective view showing a partial configuration of an image forming apparatus that uses a light emitting device according to a first embodiment of the invention as an exposure device (optical head). As shown in the figure, the image forming apparatus includes a light emitting device 10, a light-harvesting lens array 11, and a photosensitive drum (image carrier) 12. The light emitting device 10 includes a plurality of light emitting elements (not shown in FIG. 1) that are arranged on the surface of a substrate 13 in the shape of a straight light. The light emitting elements selectively emit light in accordance with the form of an image to be printed on a recording material such as a paper sheet. The photosensitive drum 12 is rotated in direction Y (the sub scanning direction in which the recording material is transported) in a state in which the outer peripheral surface thereof is brought to face the light emitting device 10 by being supported by a rotation shaft that extends in direction X (the main scanning direction).

The light-harvesting lens array 11 is disposed in a gap between the light emitting device 10 and the photosensitive drum 12. The light-harvesting lens array 11 includes a plurality of lenses 14 that has an optical axis aligned in direction Z shown in FIG. 1. Light emitted from each light emitting element of the light emitting device 10 is transmitted through a lens 14 of the light-harvesting lens array 11 and then, reaches the surface of the photosensitive drum 12. A latent image (electrostatic latent image) corresponding to a desired image is formed on the surface of the photosensitive drum 12 in accordance with the exposure.

Figure 2:
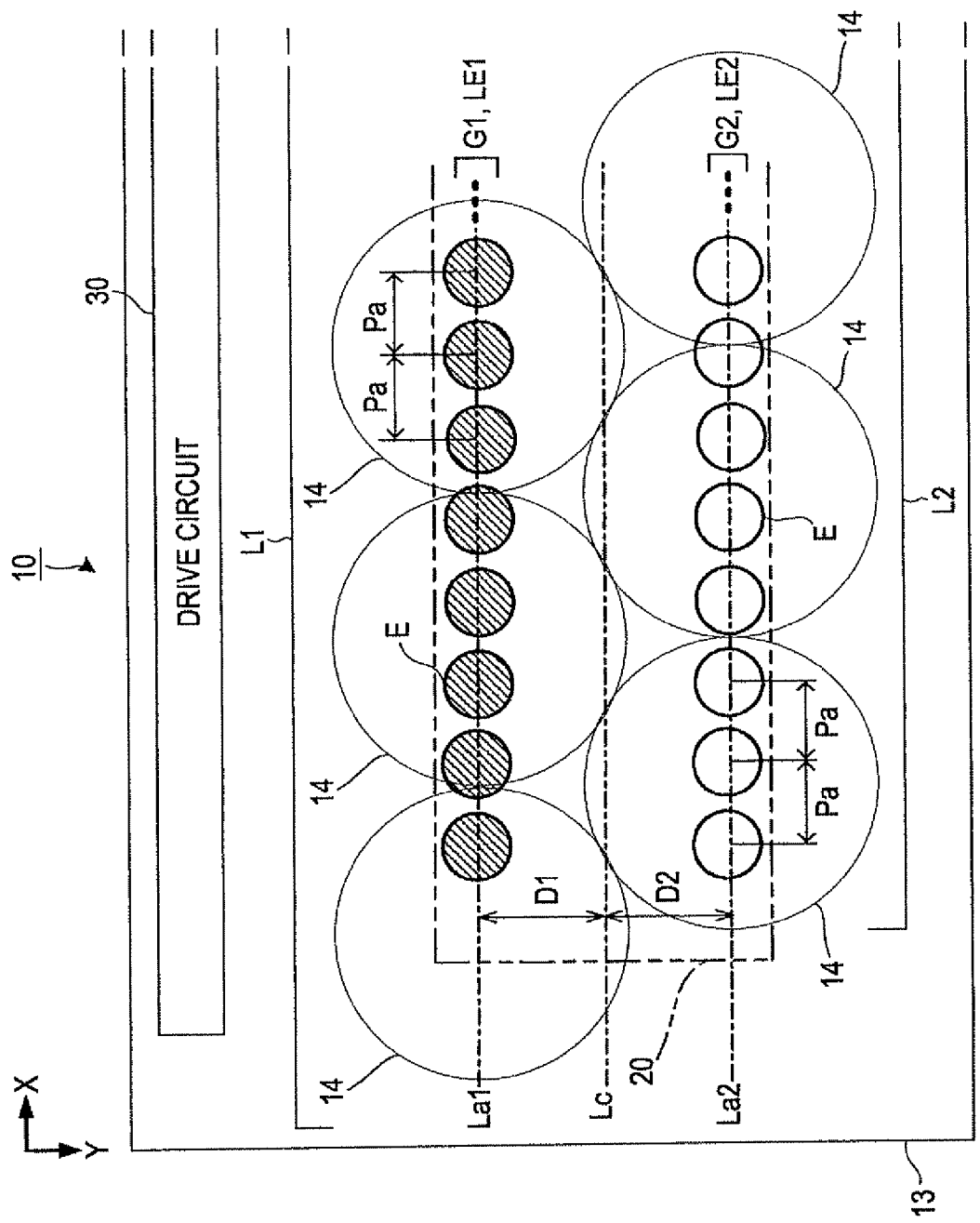
FIG. 2 is a plan view of the light emitting device according to the first embodiment.

FIG. 2 is a plan view showing relative positions of the lenses 14 of the light-harvesting lens array 11 and the light emitting device 10, viewed from direction Z. In the figure, small circles represent external shapes of the light emitting elements E, and large circles represent horizontal cross-sections of the lenses 14. As shown in FIG. 2, the light-harvesting lens array 11 includes a first lens group L1 and a second lens group L2 that are disposed in parallel with each other along direction Y (the sub scanning direction) that intersects direction X. The first lens group L1 and the second lens group L2 include a plurality of the lenses 14 that are disposed in direction X, respectively. The lens 14 is a gradient index lens having a cylindrical shape of which refractive index is distributed within the horizontal cross-section such that the refractive index thereof decreases as the position is apart away from the center axis toward the edge. As the light-harvesting lens array 11, for example, there is an SLA (Selfoc lens array) that can be acquired from Nippon Sheet Glass Company (Selfoc is a registered trademark of Nippon Sheet Glass Company).

As shown in FIG. 2, the light emitting device 10 includes a light emitting unit 20 and a drive circuit 30. The light emitting unit 20 includes element groups G (G1 and G2) of two rows that are disposed in parallel with each other in direction Y. The element group G1 is a set of n light emitting elements F that are disposed in a pitch Pa such that the center of each element of the element group G1 is located on a line La1 that passes through the center of each lens 14 of the first lens group L1. The element group G2 is a set of n light emitting elements E that are disposed in a pitch Pa such that the center of each element of the element group G2 is located on a line La2 that passes through the center of each lens 14 of the second lens group L2 and is parallel to the line La1. The light emitting element E is an organic EL element acquired from interposing a light emitting layer of an organic EL material between an anode and a cathode. In this embodiment, the element group G1 configures the first light emitting line LE1, and the element group G2 configures the second light emitting line LE2. For the convenience of description, in FIG. 2, the light emitting elements E belonging to the first light emitting line LE1 are denoted by hatched circles, and the light emitting elements E belonging to the second light emitting line LE2 are denoted by white circles (this also applies to other embodiments of the invention). The drive circuit 30 drives the light emitting elements E that belong to one LE between the first light emitting line LE1 and the second light emitting line LE2. Alternatively, a configuration in which the drive circuit 30 is externally attached to the substrate 13 may be used.

Now, in FIG. 2, a reference line Lc that has a same distance from the line La1 and the line La2 in direction Y is considered. As shown in FIG. 2, the element group G1 is disposed on one side (a negative side of direction Y) from the reference line Lc in direction Y, and the element group G2 is disposed on the other side (a positive side of direction Y). As shown in FIG. 2, a distance D1 between the reference line Lc and the center of the light emitting element E belonging to the element group G1 in direction Y is the same as a distance D2 between the reference line Lc and the center of the light emitting element E belonging to the element group G2 in direction Y.

Figure 3:
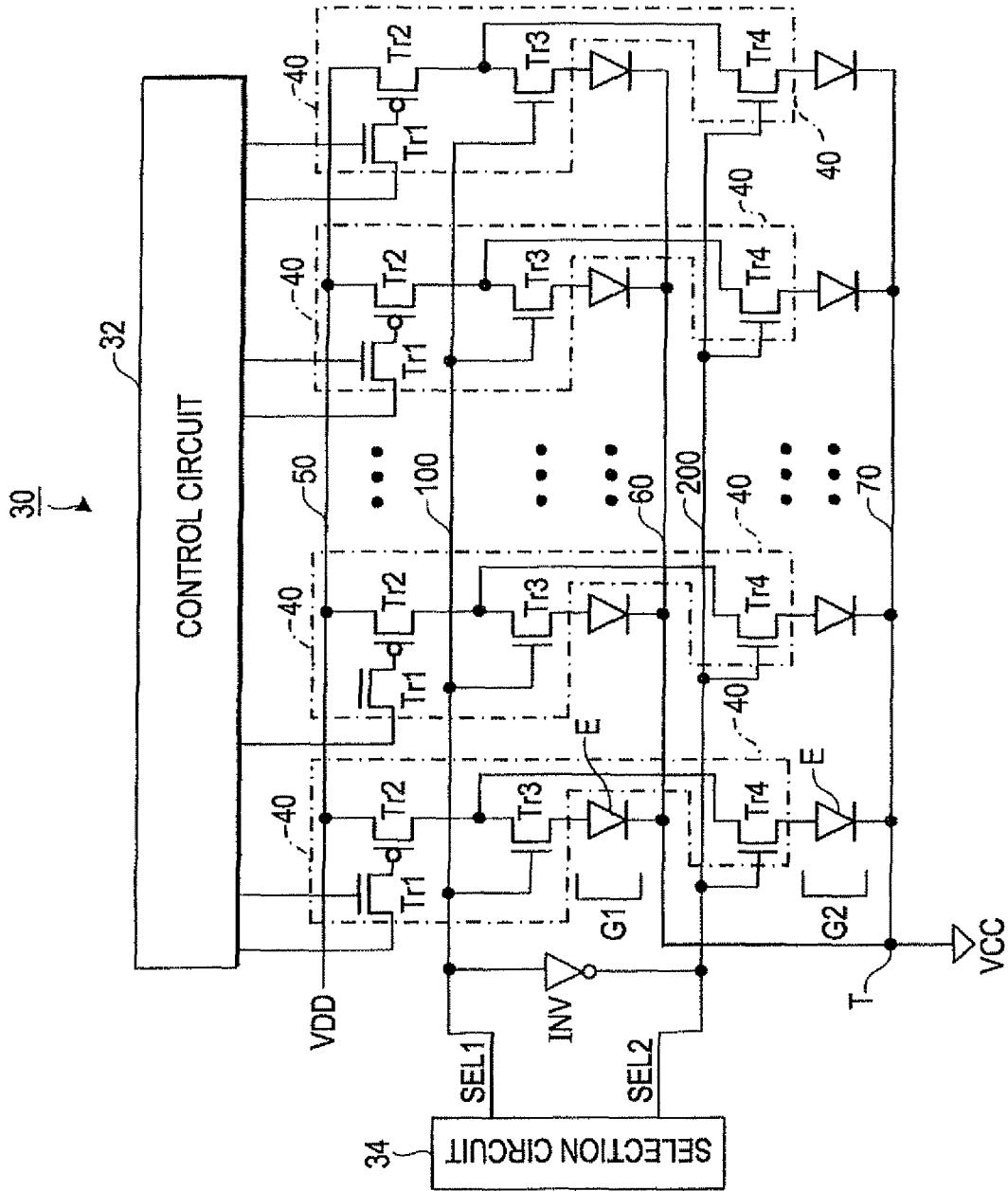
FIG. 3 is a circuit diagram of a drive circuit of the light emitting device according to the first embodiment.

FIG. 3 is a circuit diagram of the drive circuit 30. As shown in FIG. 3, the drive circuit 30 includes a control circuit 32, n driver units 40, and an inverter INV. Each driver unit 40 includes a control transistor Tr1, a driving transistor Tr2, and switching transistors Tr3 and Tr4. Each driver unit supplies a driving current to the light emitting element E belonging to any one between the first light emitting line LE1 and the second light emitting line LE2. As shown in FIG. 3, each light emitting element E belonging to the element group G1 is disposed between a high-potential power source line 50 to which a power source electric potential VDD is supplied and a first low-potential power source line 60. In addition, each light emitting element E belonging to the element group G2 is disposed between the high-potential power source line 50 and a second low-potential power source line 70. The first low-potential power source line 60 and the second low-potential power source line are connected in a point T shown in FIG. 3. In addition, to the first low-potential power source line 60 and the second low-potential power source line 70, the ground electric potential VCC is supplied commonly.

The control transistor Tr1 is an N-channel type transistor that controls whether an electric potential corresponding to gray scale data (data that designates the gray scale of the light emitting element E) is to be supplied to the driving transistor Tr2. The gate and drain of the control transistor Tr1 are connected to the control circuit 32. The driving transistor Tr2 is a P-channel type transistor that generates a driving current corresponding to a voltage applied between the gate and the source and supplies the driving current to the switching transistor Tr3 or Tr4. The source of the driving transistor Tr2 is connected to the high-potential power source line 50, and the gate of the driving transistor Tr2 is connected to the drain of the control transistor Tr1.

The switching transistors Tr3 and Tr4 are N-channel type transistors that switch between the light emitting elements E to be supplied with the driving current. The drains of the switching transistors are connected to the drain of the driving transistor Tr2. The switching transistor Tr3 is interposed between the driving transistor Tr2 and the anode of the light emitting element E of the element group G1 so as to control electrical connection (conduction or non-conduction) therebetween. The gate of the switching transistor Tr3 is connected to a first selection signal line 100. As shown in FIG. 3, to the first selection signal line 100, a selection signal SEL1 is supplied from a selection circuit 34. When the selection signal SEL1 has a high level, the switching transistor Tr3 is in the ON state. On the other hand, when the selection signal SEL1 has a low level, the switching transistor Tr3 is in the OFF state.

The switching transistor Tr4 is interposed between the driving transistor Tr2 and the anode of the light emitting element E of the element group G2 so as to control electrical connection (conduction or non-conduction) therebetween. The gate of the switching transistor Tr4 is connected to a second selection signal line 200. As shown in FIG. 3, between the first selection signal line 100 and the second selection signal line 200, an inverter INV is disposed. The inverter INV supplies a selection signal SEL2 that is acquired from inverting the selection signal SEL1 to the second selection signal line 200. When the selection signal SEL2 has a high level, the switching transistor Tr4 is in the ON state. On the other hand, when the selection signal SEL2 has a low level, the switching transistor Tr4 is in the OFF state. Alternatively, a selection signal SEL2 that is generated independently of the selection signal SEL1 may be supplied from an external control unit to the second selection signal line 200. In such a case, the inverter INV is not needed.

For a case where the first light emitting line LE1 (element group G1) is to emit light, the selection signal SEL1 is set to the high level. Accordingly, the switching transistor Tr3 is in the ON state, and the switching transistor Tr4 is in the OFF state. In this state, a signal is supplied to the gate of the control transistor Tr1 from the control circuit 32, and the control transistor Tr1 is in the ON state. Thus, an electric potential corresponding to the gray scale data of the light emitting element E of the element group G1 is supplied to the gate of the driving transistor Tr2. In the driving transistor Tr2, a driving current is generated in accordance with the voltage applied between the gate and source thereof, and the driving current is supplied to the light emitting element E of the element group G1 through the switching transistor Tr3. As a result, the first light emitting line LE1 (element group G1) emits light. In such a case, since the switching transistor Tr4 is in the OFF state, the driving current generated by the driving transistor Tr2 is not supplied to the light emitting element E belonging to the element group G2. On the other hand, for a case where the second light emitting line LE2 (element group G2) is to emit light, the selection signal SEL2 has the high level, and the switching transistor Tr4 is in the ON state, contrary to the above-described case. Accordingly, the driving current generated by the driving transistor Tr2 is supplied to the light emitting element E belonging to the element group G2 through the switching transistor Tr4. As a result, the second light emitting line LE2 (element group G2) emits light.

Figure 4:
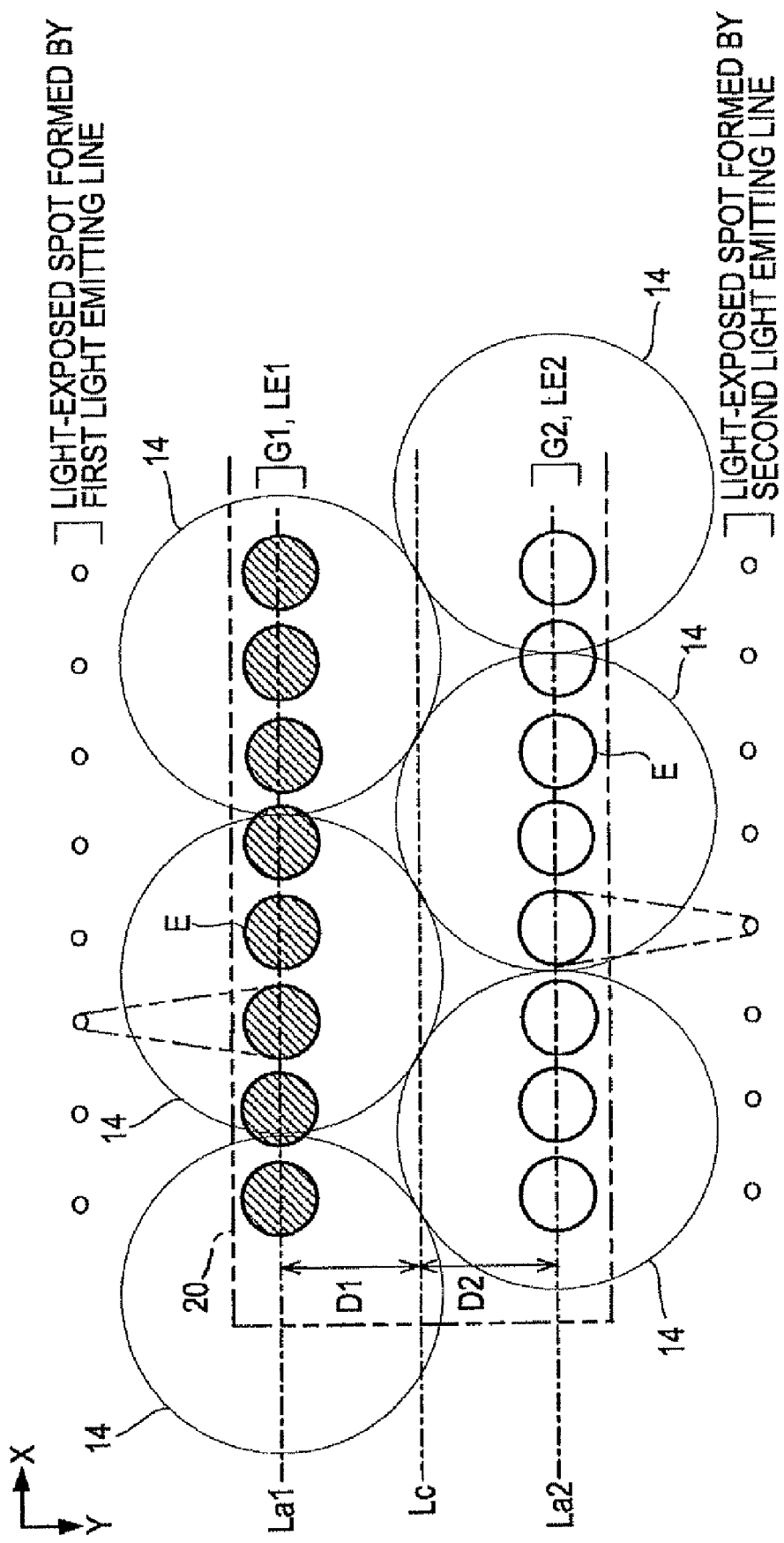
FIG. 4 is a diagram for describing exposure by using the light emitting device according to the first embodiment.

FIG. 4 is a diagram showing an area (exposure spot) in which light emitted from each light emitting element E belonging to the light emitting line LE reaches the exposure surface of the photosensitive drum 12 by being transmitted through the light-harvesting lens array 11. In this embodiment, since the distance D1 between the reference line Lc and each light emitting element E belonging to the element group G1 in direction Y and the distance D2 between the reference line Lc and each light emitting element E belonging to the element group G2 in direction Y are the same, a form of each exposure spot that is formed on the exposure surface of the photosensitive drum 12 in accordance with emission of each light emitting element E belonging to the element group G1 and a form of each exposure spot that is formed on the exposure surface of the photosensitive drum 12 in accordance with emission of each light emitting element E belonging to the element group G2 can be uniform. Accordingly, non-uniformity of the quality of light exposure for a case where the element group G1 emits light and a case where the element group G2 emits light can be suppressed.

In addition, according to this embodiment, the position of each light emitting element E belonging to the element group G1 and the position of each light emitting element E belonging to the element group G2 in direction X are the same.

Accordingly, even when the used light emitting line LE (element group G) is changed, a change of the form or position of each imaged body can be suppressed.

Second Embodiment

Figure 5:
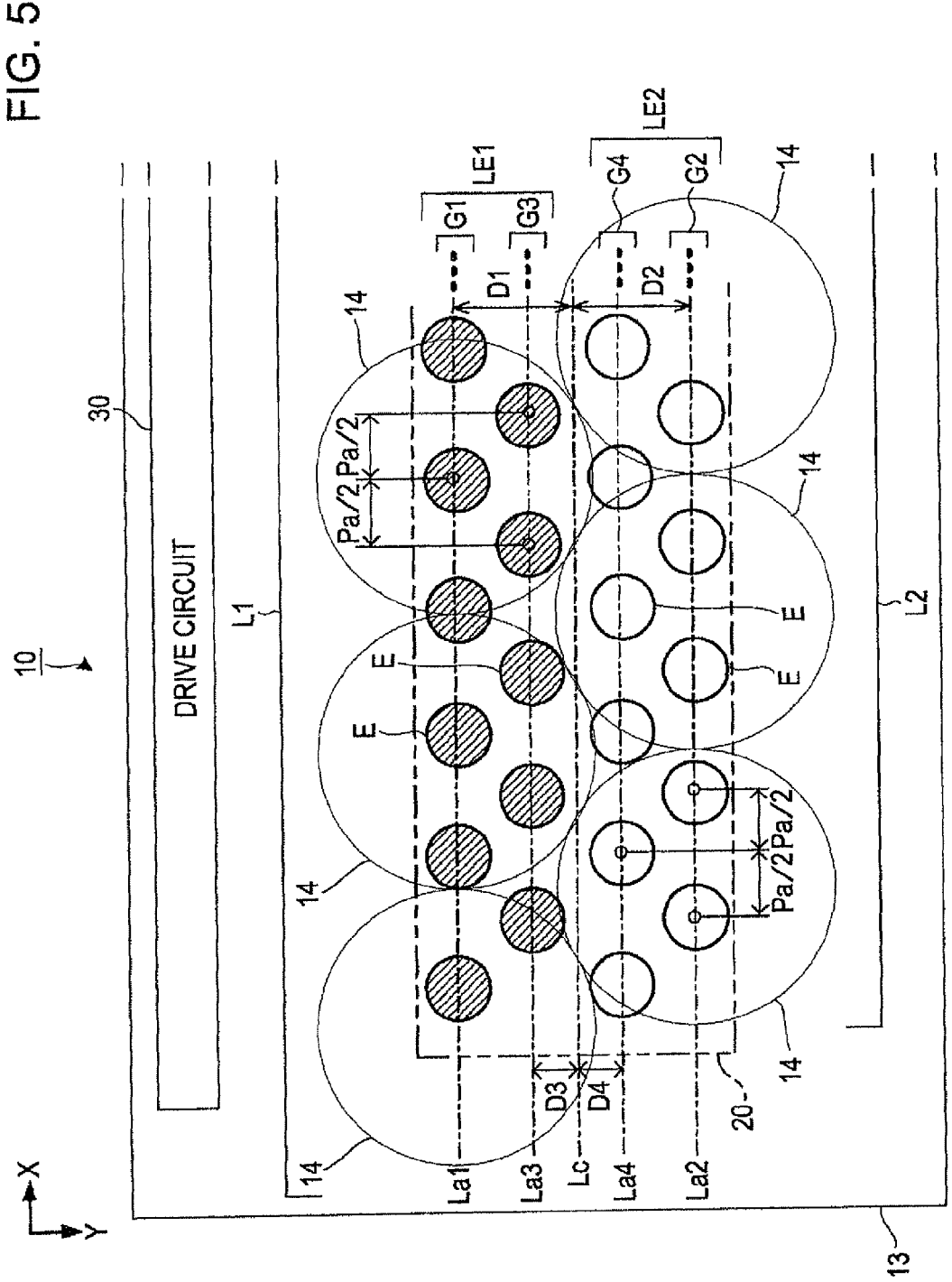
FIG. 5 is a plan view of a light emitting device according to a second embodiment of the invention.

FIG. 5 is a plan view showing relative positions of the lenses 14 of the light-harvesting lens array 11 and a light emitting device 10 according to a second embodiment of the invention, viewed from direction Z. In this embodiment, the light emitting unit 20 includes element groups G (G1, G2, G3, and G4) of four rows disposed in parallel with one another in direction Y (sub scanning direction) that intersects direction X, which is different from that of the first embodiment. Each of the element group G3 and the element group G4, similar to the element group G1 and the element group G2, is formed of n light emitting elements E that are formed on the surface of the substrate 13. Other configurations of the second embodiment are the same as those of the first embodiment, and thus, a description of each duplicate part is omitted here.

As shown in FIG. 5, the element group G3, similar to the element group G1, is disposed on one side (a negative side of direction Y) from the reference line Lc in direction Y. As shown in FIG. 5, each light emitting element E belonging to the first element group G1 and each light emitting element E belonging to the third element group G3 are disposed in positions that are different in direction X. Described in more details, the element group G3 that is a set of a plurality of elements E disposed in a pitch Pa such that the center of each element is located on a line La3 that extends in direction X and the element group G1 that is a set of a plurality of elements E disposed in the pitch Pa such that the center of each element is located on a line La1 that is parallel to the line La3 are disposed in positions deviated by Pa/2 in direction X. In other words, as shown in FIG. 5, the light emitting elements E belonging to the element group G1 and the element group G3 are disposed in a zigzag pattern of two rows.

On the other hand, as shown in FIG. 5, the fourth element group G4, similar to the second element group G2, is disposed on the other side (the positive side of direction Y) from the reference line Lc in direction Y. As shown in FIG. 5, each light emitting element E belonging to the second element group G2 and each light emitting element E belonging to the fourth element group G4 are disposed in positions different from each other in direction X. Described in more details, the element group G4 that is a set of a plurality of elements E disposed in the pitch Pa such that the center of each element is located on a line La4 that extends in direction X and the element group G2 that is a set of a plurality of elements E disposed in the pitch Pa such that the center of each element is located on a line La2 that is parallel to the line La4 are disposed in positions deviated by Pa/2 in direction X. In other words, as shown in FIG. 5, the light emitting elements E belonging to the element group G2 and the element group G4 are disposed in a zigzag pattern of two rows.

in addition, as shown in FIG. 5, a distance D3 between the reference line Lc and the center of the light emitting element E belonging to the element group G3 in direction Y is the same as a distance D4 between the reference line Lc and the center of the light emitting element E belonging to the element group G4 in direction Y. In addition, the distance D3 is different from the distance D1 or the distance D2. According to this embodiment, the element groups G3 and G4 are located between the element group G1 and the element group G2 (D1=D2>D3=D4). In addition, according to this embodiment, the first light emitting line LE1 is configured by the element group G1 and the element group G3, and the second light emitting line LE2 is configured by the element group G2 and the element group G4. Each light emitting element E belonging to either the first light emitting line LE1 or the second light emitting line LE is selectively driven by each driver unit 40, as in the first embodiment.

Figure 6:
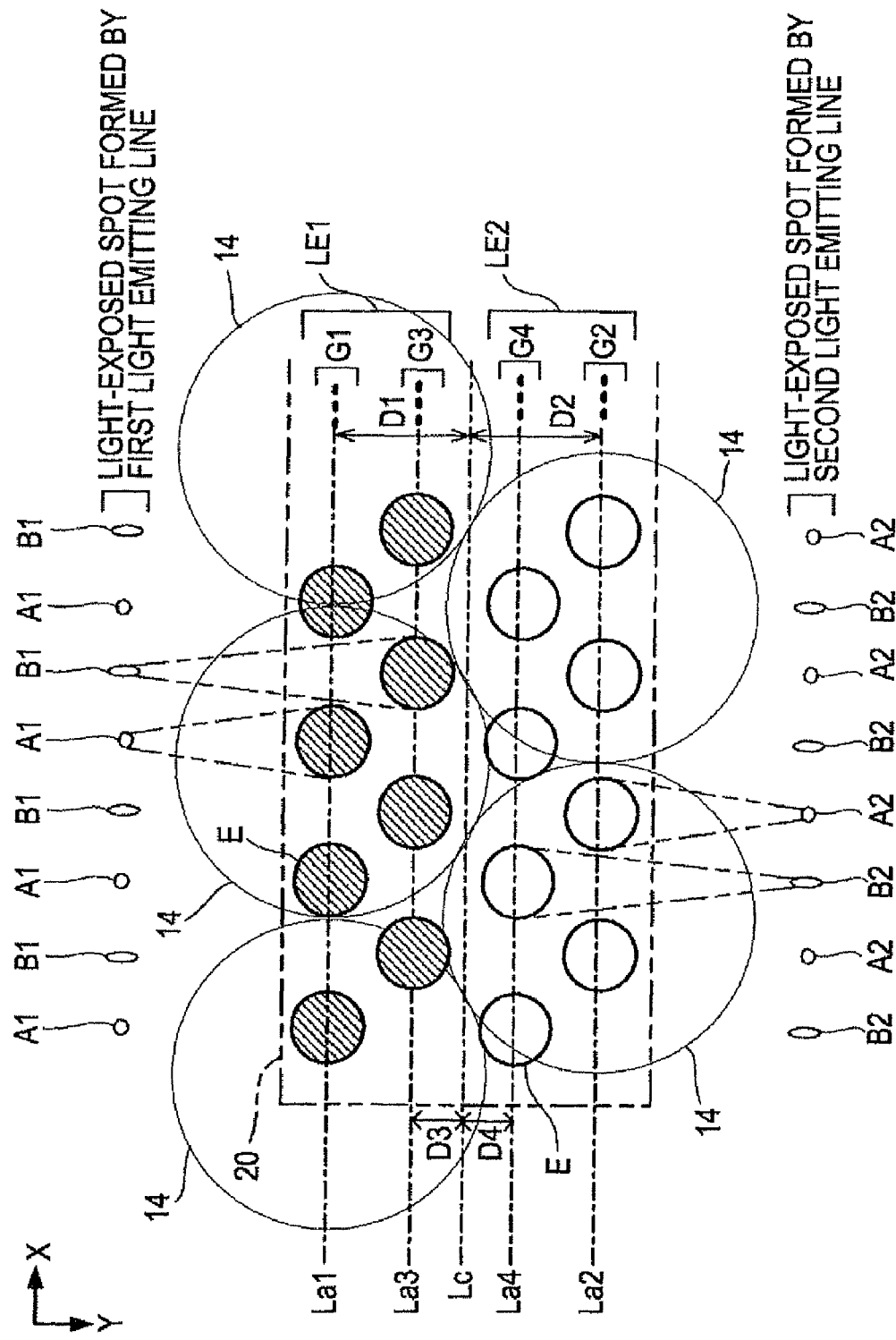
FIG. 6 is a diagram for describing exposure by using the light emitting device according to the second embodiment.

FIG. 6 is a diagram showing an area (exposure spot) in which light emitted from each light emitting element E belonging to the used element group G reaches the exposure surface of the photosensitive drum 12 by being transmitted through the light-harvesting lens array 11. Now, a case where the first light emitting line LE1 is used will be considered. As shown in FIG. 6, since each light emitting element E belonging to the element group G1 is located near (on) the line La1 in which the lenses 14 of the first lens group L1 are arranged, each exposure spot A1 for a case where the element group G1 emits light is in an even shape (for example, a precise circle). On the other hand, since each light emitting element E belonging to the element group G3 is located in a position (near the edge of the lens 14) departed farther from the line La1 than each light emitting element E belonging to the element group G1, each exposure spot B1 for a case where the element group G3 emits light is in an uneven shape (for example, an elliptical shape). In such a case, when the first light emitting line LE1 is used, as shown in FIG. 6, a form in which the exposure spot A1 and the exposure spot B1 alternately appear on the exposure surface of the photosensitive drum 12 is represented.

Next, a case where the second light emitting line LE2 is used will be considered. As shown in FIG. 6, since each light emitting element E belonging to the element group G2 is located near the line La2 in which the lenses 14 of the first lens group L2 are arranged, each exposure spot A2 for a case where the element group G2 emits light is in an even shape (for example, a precise circle). On the other hand, since each light emitting element E belonging to the element group G4 is located in a position near the edge of each lens 14 belonging to the second lens group L2, that is, a position departed farther from the line La2 than each light emitting element E belonging to the element group G2, each exposure spot B2 for a case where the element group G4 emits light is in an uneven shape (for example, an elliptical shape). In such a case, when the second light emitting line LE2 is used, as shown in FIG. 6, a form in which the exposure spot A2 and the exposure spot B2 alternately appear on the exposure surface of the photosensitive drum 12 is represented.

In this embodiment, the distance D1 between the reference line Lc and each light emitting element E belonging to the element group G1 in direction Y and the distance D2 between the reference line Lc and each light emitting element E belonging to the element group G2 in direction Y are the same, and the distance D3 between the reference line Lc and each light emitting element E belonging to the element group G3 in direction Y and the distance D4 between the reference line Lc and each light emitting element E belonging to the element group G4 in direction Y are the same. Accordingly, a form of the exposure spots that are formed on the exposure surface of the photosensitive drum 12 in accordance with emission of the first light emitting line LE1 including the element group G1 and the element group G3 and a form of the exposure spots that are formed on the exposure surface of the photosensitive drum 12 in accordance with emission of the second light emitting line LE2 including the element group G2 and the element group G4 can be uniform. In other words, both the exposure spots formed by the first light emitting line LE1 and the exposure spots formed by the second light emitting line LE2 are in a form in which a precise circle shape and an elliptical shape are mixed. Accordingly, non-uniformity of the forms of the exposure spots for a case where the first light emitting line LE1 emits light and a case where the second light emitting line LE2 emits light can be suppressed, and thereby the quality of light exposure of the light emitting device 10 can be improved.

In order to form a high-definition image, the gap between the light emitting elements E belonging to each light emitting line LE in direction X is needed to decrease. According to this embodiment, the light emitting elements E belonging to the first light emitting line LE1 and the second light emitting line LE2 are disposed in a zigzag pattern of two rows, respectively. Accordingly, a distance (Pa/2) between the light emitting elements E, which are adjacent in direction X, of each light emitting line LE in direction X can be configured to be shorter than that of a configuration in which a plurality of the light emitting elements E of one light emitting line is arranged in the pitch Pa only in one row (for example, the configuration of the first embodiment shown in FIG. 2) As a result, according to the configuration of this embodiment, there is an advantage that an image (latent image) formed on the photosensitive drum 12 by the light emitting device 10 has definition higher than that of the first embodiment.

Third Embodiment

The combination of the element group G configuring each light emitting line LE according to a third embodiment of the invention is different from that according to the second embodiment. Other configurations of the third embodiment are the same as those of the second embodiment, and thus, a description of each duplicate part is omitted here.

Figure 7:
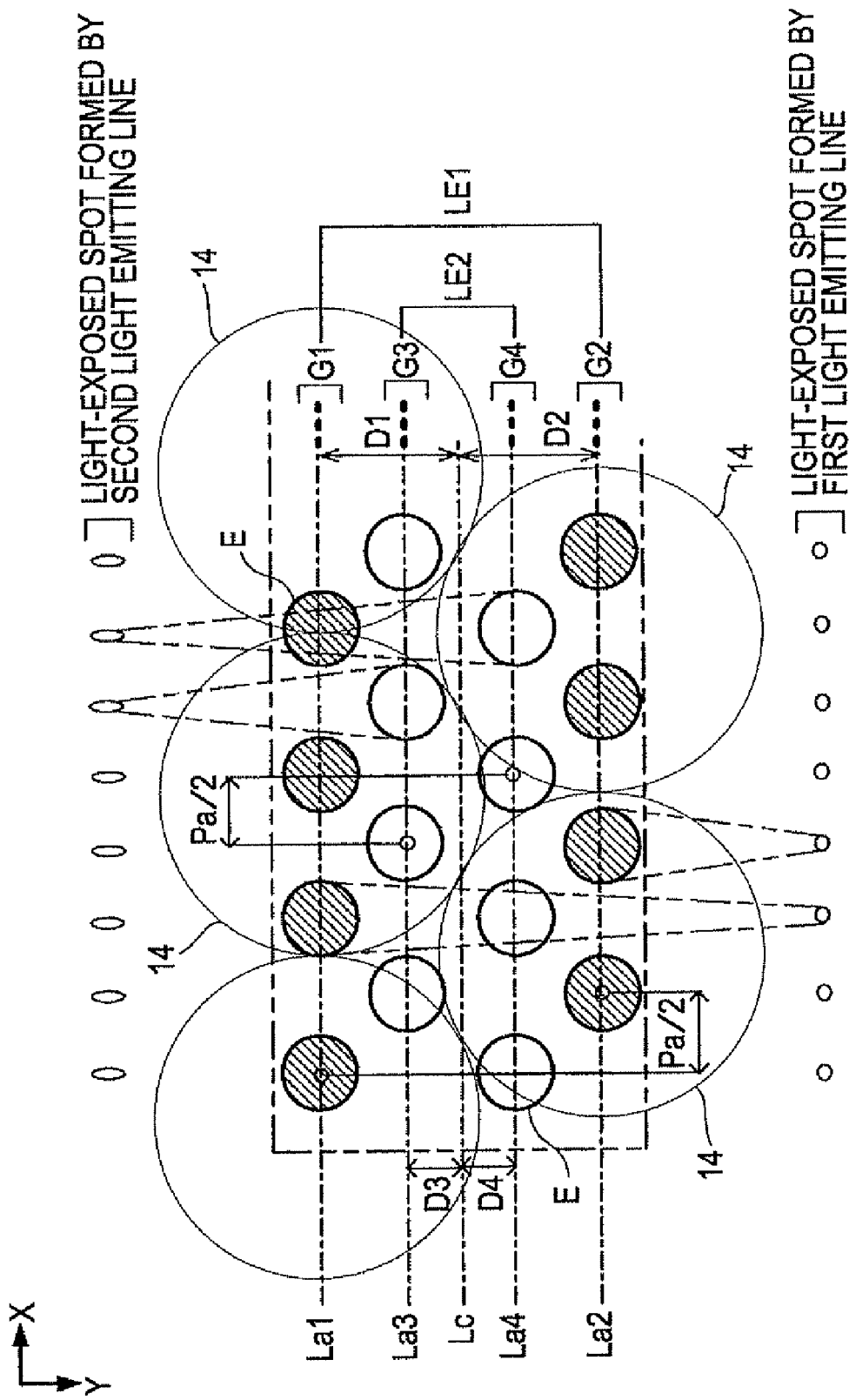
FIG. 7 is a diagram for describing exposure by using a light emitting device according to a third embodiment of the invention.

FIG. 7 is a diagram showing an area (exposure spot) in which light emitted from each light emitting element E belonging to the element group G reaches the exposure surface of the photosensitive drum 12 by being transmitted through the light-harvesting lens array 11. As shown in FIG. 7, the first light emitting line LE1 is configured by the element group G1 and the element group G2, and the second light emitting line LE2 is configured by the element group G3 and the element group G4. Each light emitting element E belonging to the element group G1 and each light emitting element E belonging to the element group G2 are disposed in positions different from each other in direction X. Described in more details, each light emitting element E belonging to the element group G1 and each light emitting element E belonging to the element group G2 are disposed to be deviated by Pa/2 in direction X. In other words, as shown in FIG. 7, the light emitting elements E belonging to the element group G1 and the element group G2 are disposed in a zigzag pattern of two rows. In addition, as shown in FIG. 7, each light emitting element E belonging to the element group G3 and each light emitting element E belonging to the fourth element group G2 are disposed in positions different from each other in direction X. Described in more details, each light emitting element E belonging to the element group G3 and each light emitting element E belonging to the element group G4 are disposed to be deviated by Pa/2 in direction X. In other words, as shown in FIG. 7, the light emitting elements E belonging to the element group G3 and the element group G4 are disposed in a zigzag pattern of two rows.

Now, a case where the first light emitting line LE1 is used will be considered. As shown in FIG. 7, since each light emitting element E belonging to the element group G1 is located near (on) the line La1 in which the lenses 14 of the first lens group L1 are arranged and each light emitting element E belonging to the element group G2 is located near (on) the line La2 in which the lenses 14 of the second lens group L2 are arranged, each exposure spot for a case where the element group G1 and the element group G2 emit light is in an even shape (for example, a precise circle shape). In addition, since each light emitting element E belonging to the first light emitting line LE1 is disposed in a zigzag pattern of two rows, a high-definition image (latent image) that is formed on the image carrier by the light emitting device 10 can be acquired. Accordingly, when the first light emitting line LE1 according to this embodiment is used, a high definition image (latent image) can be formed with the exposure spots formed on the exposure surface of the photosensitive drum 12 formed in a uniform and even shape. In other words, the quality of light exposure of the light emitting device 10 can be improved. In descriptions here, the quality of light exposure not only includes the degree of non-uniformity of forms of the exposure spots accompanied with a change of the light emitting line LE but also includes uniformity of the shapes of the exposure spots formed by the used light emitting line LE and the degree of definition of a formed image according to this embodiment in a broad meaning.

Next, a case where the second light emitting line LE2 is used will be considered. Since each light emitting element E belonging to the element group G3 is located in a position (near the edge of the lens 14) farther from the line La1 than each light emitting element E belonging to the element group G1, each imaged body for a case where the element group G3 emits light is in an uneven shape as an ellipse. In addition, since each light emitting element E belonging to the element group G4 is located in a position (near the edge of the lens 14) farther from the line La2 than each light emitting element E belonging to the element group G2, each imaged body for a case where the element group G4 emits light is in an uneven shape as an ellipse. Accordingly, as shown in FIG. 7, the image formed on the exposure surface of the photosensitive drum for a case where the second light emitting line is used is an uneven shape as an ellipse.

According to this embodiment, one light emitting line LE between the first light emitting line LE1 and the second light emitting line LE2 is selected in accordance with a use mode. For example, in an image forming apparatus (for example, a printer) using the light emitting device 10, a high resolution is not needed for a case where a natural color image is printed. On the other hand, a high resolution is required for a case where characters and delicate graphics are printed. Accordingly, by using the first light emitting line LE1 for a print mode requiring a high resolution and using the second light emitting line LE2 for a print mode not requiring a high resolution, an image appropriate for each mode can be formed.

Fourth Embodiment

Figure 8:
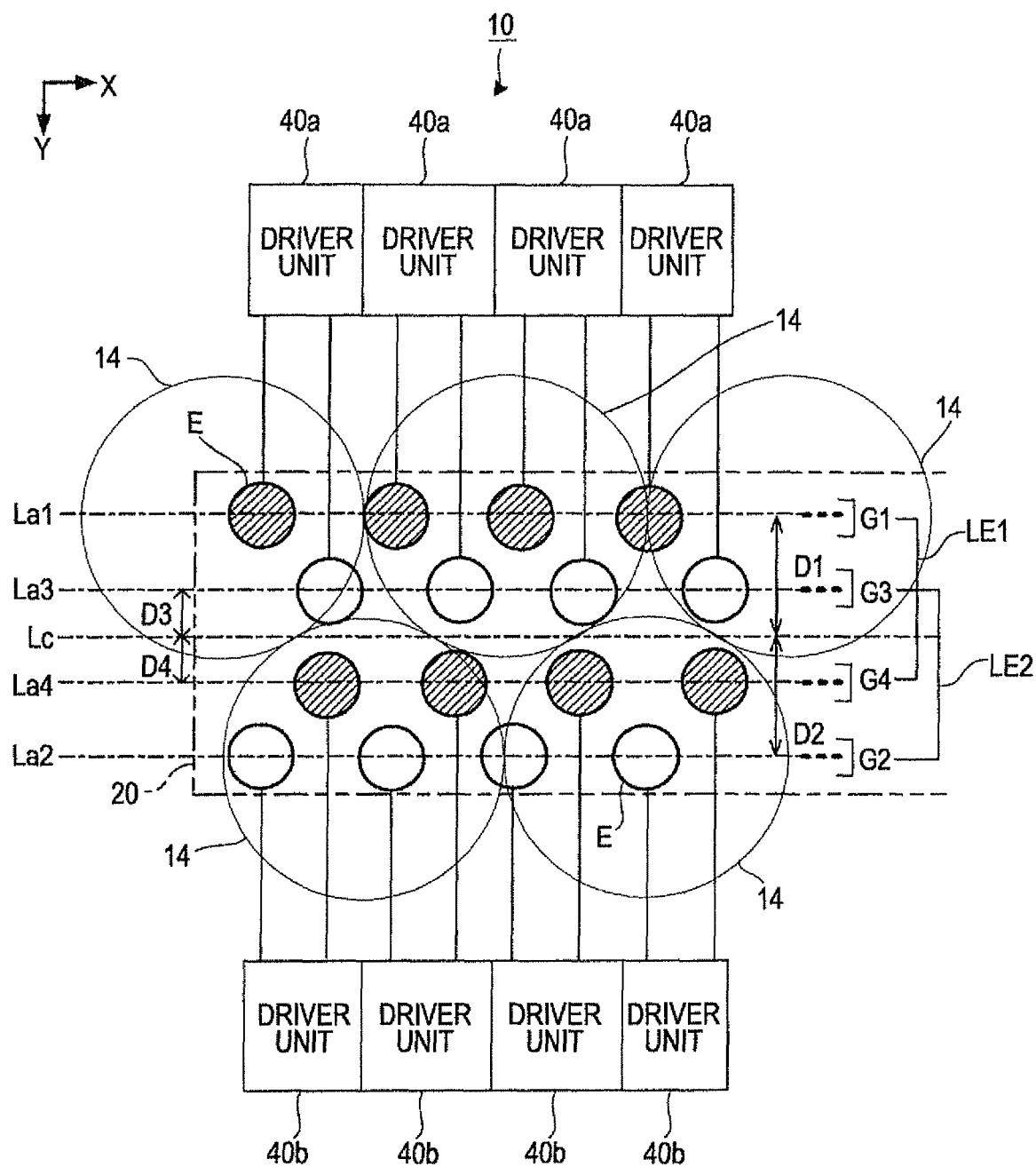
FIG. 8 is a plan view of a light emitting device according to a fourth embodiment of the invention.

FIG. 8 is a plan view showing relative positions of a light emitting device 10 according to a fourth embodiment of the invention and the lenses 14 of the light-harvesting lens array 11. According to this embodiment, the first light emitting line LE1 is configured by the element group G1 and the element group G4, and the second light emitting line LE2 is configured by the element group G2 and the element group G3.

On one side (the negative side of direction Y) of the reference line Lc, n first driver units 40a each selectively supplying a driving current to one of the light emitting element E belonging to the element group G1 and the light emitting element E belonging to the element group G3 are disposed in direction X. To each of the first driver units 40a, one light emitting element E of the element group G1 and one light emitting element E of the element group G3 are connected. In addition, on the other side (the positive side of direction Y) of the reference line Lc, n second driver units 40b each selectively supplying a driving current to one of the light emitting element E belonging to the element group G2 and the light emitting element E belonging to the element group G4 are disposed in direction X. To each of the second driver units 40b, one light emitting element E of the element group G2 and one light emitting element E of the element group G4 are connected. Each light emitting element E belonging to one light emitting line LE between the first light emitting line LE1 and the second light emitting line LE is selectively driven by each driver unit 40. Described in more details, when the first light emitting line LE1 emits light, driving currents are selectively supplied from the first driver units 40a to the light emitting elements E belonging to the element group G1, and driving currents are selectively supplied from the second driver units 40b to the light emitting elements E belonging to the element group G4. On the other hand, when the second light emitting line LE2 emits light, driving currents are selectively supplied from the first driver units 40a to the light emitting elements E belonging to the element group G3, and driving currents are selectively supplied from the second driver units 40b to the light emitting elements E belonging to the element group G2.

As shown in FIG. 8, each light emitting element E belonging to the element group G1 and each light emitting element E belonging to the element group G4 are disposed in positions different from each other in direction X. Described in more details, each light emitting element E belonging to the element group G1 and each light emitting element E belonging to the element group G4 are disposed to be deviated by Pa/2 in direction X. In other words, as shown in FIG. 8, the light emitting elements E belonging to the element group G1 and the element group G4 are disposed in a zigzag pattern of two rows in addition, as shown in FIG. 8, each light emitting element E belonging to the element group G2 and each light emitting element E belonging to the element group G3 are disposed in positions different from each other in direction X. Described in more details, each light emitting element E belonging to the element group G2 and each light emitting element E belonging to the element group G3 are disposed to be deviated by Pa/2 in direction X. In other words, as shown in FIG. 8, the light emitting elements E belonging to the element group G2 and the element group G3 are disposed in a zigzag pattern of two rows.

Figure 9:
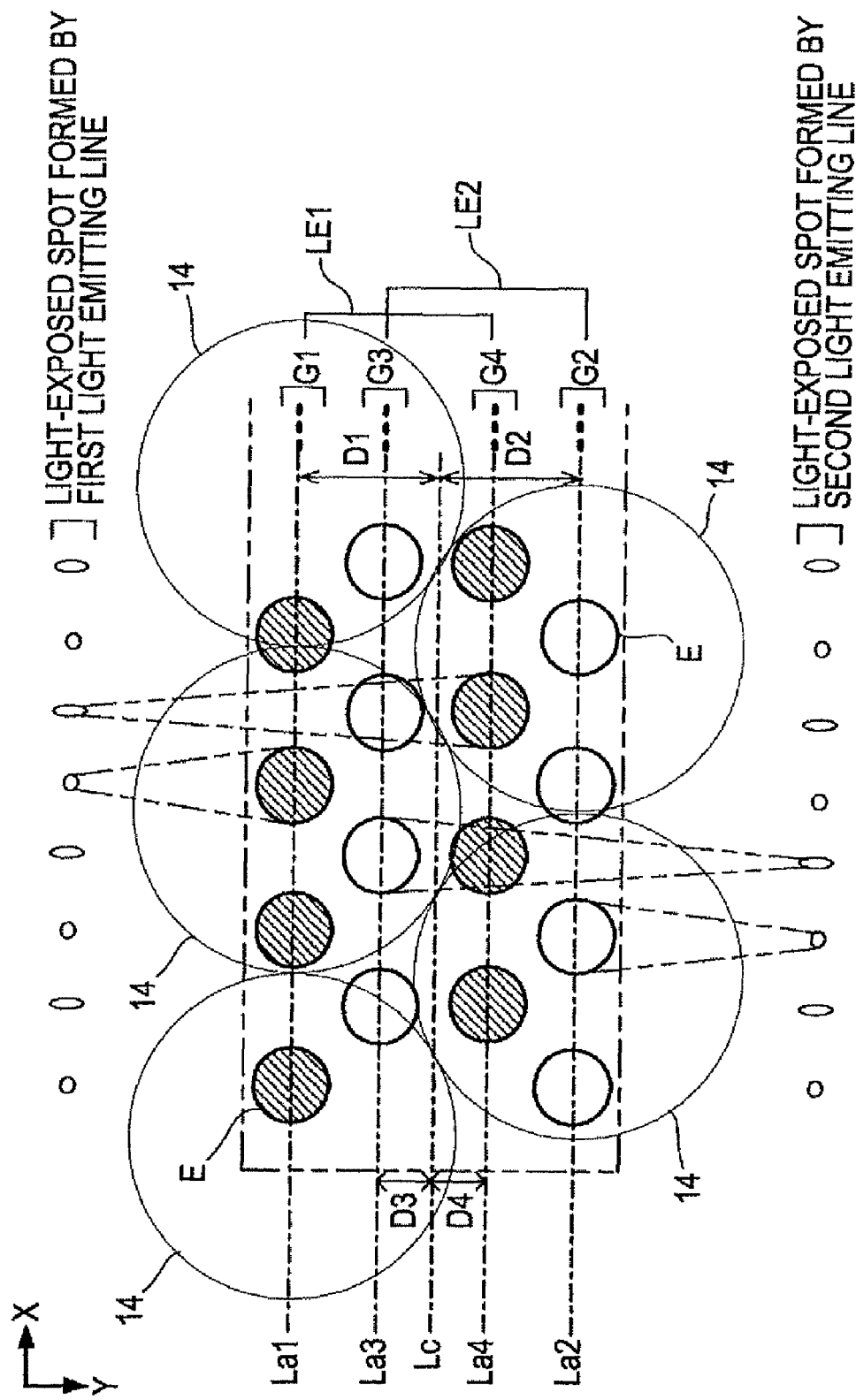
FIG. 9 is a diagram for describing exposure by using a light emitting device according to the fourth embodiment.

FIG. 9 is a diagram showing an area (exposure spot) in which light emitted from each light emitting element E belonging to the used element group G reaches the exposure surface of the photosensitive drum 12 by being transmitted through the light-harvesting lens array 11. In this embodiment, as in the second embodiment, the distance D1 and the distance D2 are the same, and the distance D3 and the distance D4 are the same. Accordingly, as shown in FIG. 9, both the exposure spots formed by the first light emitting line LE1 including the element group G1 and the element group G4 and the exposure spots formed by the second light emitting line LE2 including the element group G2 and the element group G3 are in a form in which a precise circle shape and an elliptical shape are mixed. Accordingly, the form of the exposure spots formed by the light emitting line LE1 and the form of the exposure spots formed by the light emitting line LE2 can be uniform.

Figure 10:
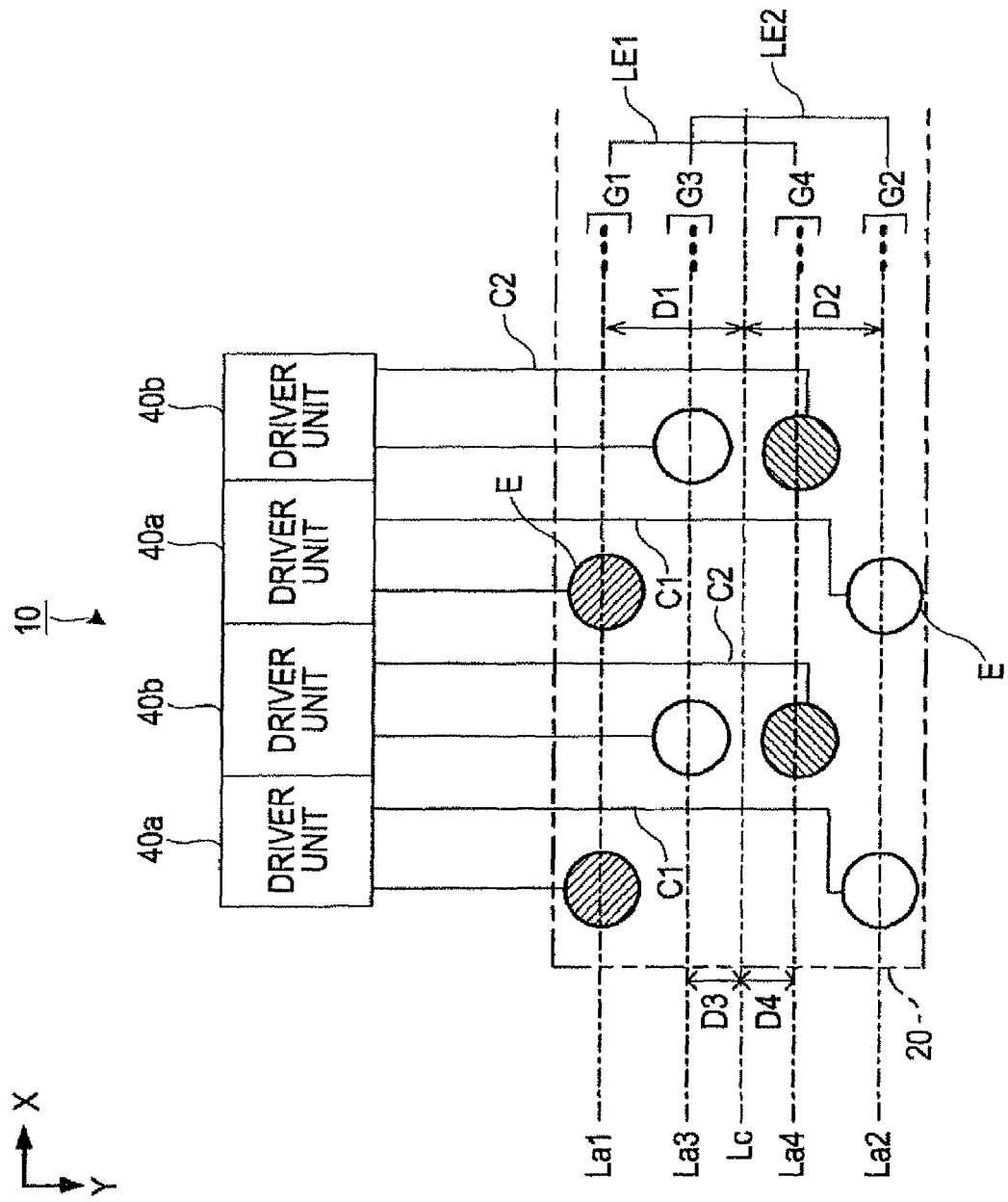
FIG. 10 is a plan view of a light emitting device according to a comparative example of the fourth embodiment.

In addition, according to this embodiment, a plurality of the first driver units 40a is disposed on one side of the reference line Lc, and a plurality of the second driver units 40b is disposed on the other side of the reference line Lc. Now, only a form (hereinafter, referred to as a comparative example) in which a plurality of driver units 40 is disposed only on one side of the reference line Lc will be described. As shown in FIG. 10, in the comparative example, n first driver units 40a each selectively supplying a driving current to one of the light emitting element E belonging to the element group G1 and the light emitting element E belonging to the element group G2 are disposed and n second driver units 40b each selectively supplying a driving current to one of the light emitting element E belonging to the element group G3 and the light emitting element E belonging to the element group G4 are included. The first driver unit 40a and the second driver unit 40b are alternately disposed in direction X. The other configurations of the comparative example are the same as those of this embodiment.

In order to form a high-definition image, it is preferable that a distance between the light emitting elements E of the light emitting lines LE in direction X is short. In the comparative example, as shown in FIG. 10, between the light emitting element E of the element group G1 and the light emitting element E of the element group G4, a wiring C1 that extends from the first driver unit 40a to the light emitting element E of the element group G2 or a wring C2 that extends from the second driver unit 40b to the light emitting element E of the element group G4 is located, and accordingly, a space for passing the wiring C1 or the wiring C2 is needed to be acquired between the light emitting element E of the element group G1 and the light emitting element E of the element group G4. Similarly, also between the light emitting element E of the element group G2 and the light emitting element E of the element group G3, a space for passing the wiring C1 or the wiring C2 is needed to be acquired.

On the contrary, according to this embodiment, as shown in FIG. 8, the light emitting elements E of the element group G2 and the light emitting elements E of the element group G4 are connected to the second driver units 40b are disposed on the other side of the reference line Lc, and accordingly, wirings are not needed from the first driver units 40a disposed on one side of the reference line Lc to the light emitting elements E of the element group G2 and the light emitting elements E of the element group G4. Accordingly, a distance (a distance between the light emitting element E of the element group G1 and the light emitting element E of the element group G4 in direction X) between the light emitting elements E belonging to the first light emitting line LE1 in direction X and a distance (a distance between the light emitting element E of the element group G2 and the light emitting element E of the element group G3 in direction X) between the light emitting elements E belonging to the second light emitting line LE2 in direction X can be configured to be shorter than those of the comparative example. In other words, according to the configuration of this embodiment, both acquisition of a high definition image and suppression of non-uniformity of shapes of imaged bodies for a case where the light emitting line LE1 emits light and a case where the light emitting line LE2 emits light can be achieved.

Fifth Embodiment

Figure 11:
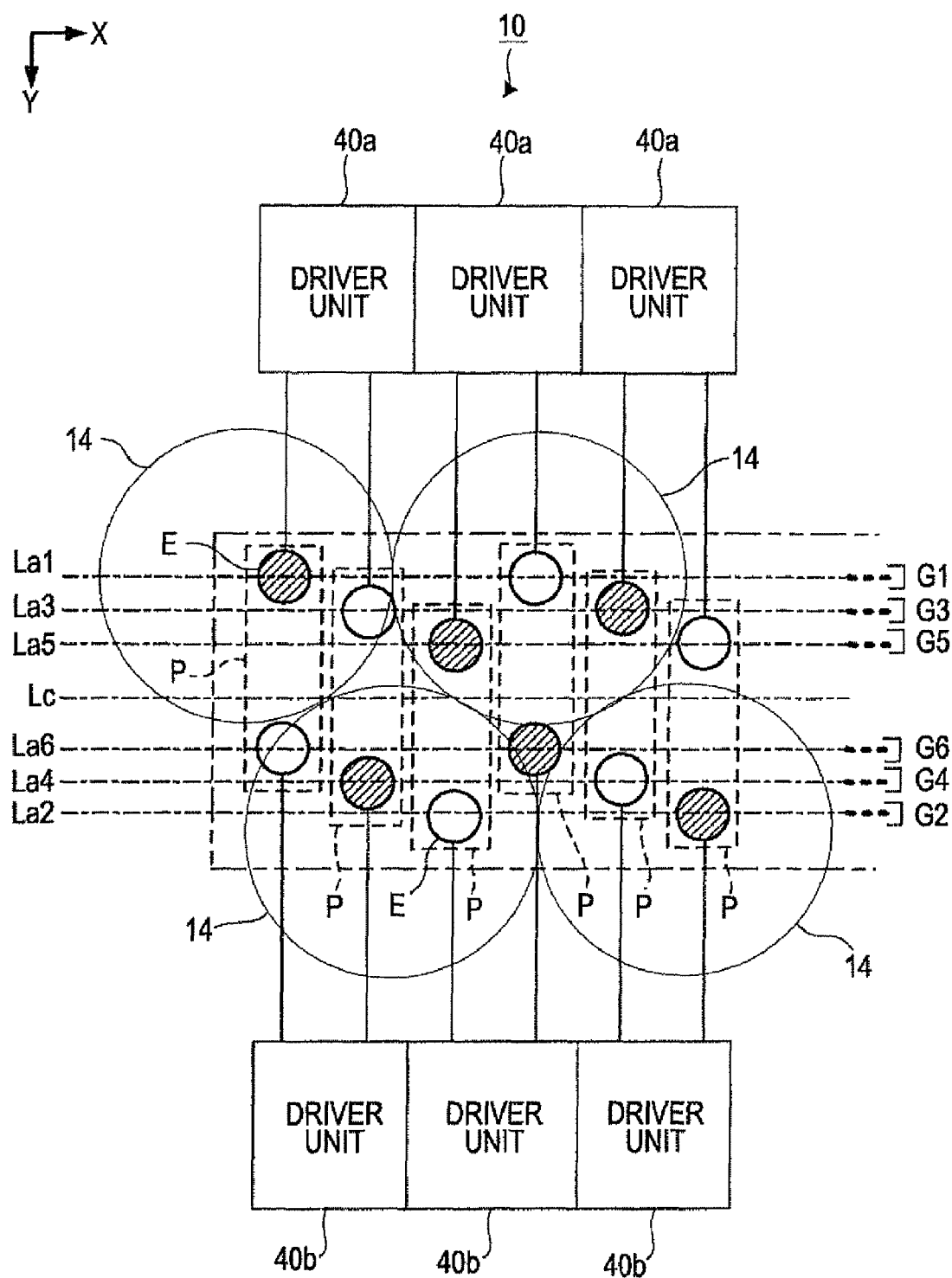
FIG. 11 is a plan view of a light emitting device according to fifth embodiment of the invention.

FIG. 11 is a plan view showing relative positions of a light emitting device 10 according to a fifth embodiment of the invention and the lenses 14 of the light-harvesting lens array 11. In this embodiment, the light emitting unit 20 includes element groups G (G1, G2, G3, G4, G5, and G6) of six rows that are disposed in parallel with one another in direction Y (the sub scanning direction) that intersects direction X.

On one side of the reference line Lc, the element group G1, the element group G3, and the element group G5 are disposed. Each light emitting element E belonging to the element group G1, each light emitting element E belonging to the element group G3, and each light emitting element E belonging to the element group G5 are disposed in positions different from one another in direction X. In addition, on one side of the reference line Lc, a plurality of first driver units 40*a* each selectively supplying a driving current to one light emitting element E of light emitting elements E connected thereto is disposed in direction X. Described in more details, to the (3 k+1)-th first driver unit 40*a*, one light emitting element E of the element group G1 and one light emitting element E of the element group G3 are connected (here, k=1, 2, . . . , j) In addition, one light emitting element E of the element group G5 and one light emitting element E of the element group G1 are connected to the (3 k+2)-th first driver unit 40*a*. In addition, one light emitting element E of the element group G3 and one light emitting element E of the element group G5 are connected to the (3 k+3)-th first driver unit 40*a*.

On the other side of the reference line Lc, the element group G2, the element group G4, and the element group G6 are disposed. Each light emitting element E belonging to the element group G2, each light emitting element E belonging to the element group G4, and each light emitting element E belonging to the element group G6 are disposed in positions different from one another in direction X. In addition, on the other side of the reference line Lc, a plurality of second driver units 40*b* each selectively supplying a driving current to one light emitting element E of light emitting elements E connected thereto is disposed in direction X. Described in more details, to the (3 k+1)-th second driver unit 40*b*, one light emitting element E of the element group G6 and one light emitting element E of the element group G4 are connected (here, k=1, 2, . . . , j). In addition, to the (3 k+2)-th second driver unit 40*b*, one light emitting element E of the element group G2 and one light emitting element E of the element group G6 are connected. In addition, to the (3 k+3)-th second driver unit 40*b*, one light emitting element E of the element group G4 and one light emitting element E of the element group G2 are connected.

Here, as shown in FIG. 11, two light emitting elements E that are disposed in direction Y with a predetermined gap interposed therebetween is regarded as one pair P. In other words, one pair P is configured by a light emitting element E of the element group G1 and a light emitting element E of the element group G6, one pair P is configured by a light emitting element E of the element group G3 and a light emitting element E of the element group G4, and one pair P is configured by a light emitting element E of the element group G5 and a light emitting element E of the element group G2. As shown in FIG. 11, a plurality of the pairs P is disposed in direction X. The first light emitting line LE1 is configured by a light emitting element E, which is disposed on one side of the reference line Lc in direction Y, of each odd pair P of the plurality of the pairs P and a light emitting element E, which is disposed on the other side of the reference line Lc in direction Y, of each even pair P of the plurality of the pairs. For the convenience of description, in FIG. 11, each light emitting element E belonging to the first light emitting line LE1 is denoted by a shaded circle. In addition, the second light emitting line LE2 is configured by a light emitting element E, which is disposed on the other side of the reference line Lc in direction Y, of each odd pair P of the plurality of the pairs P and a light emitting element E, which is disposed on the one side of the reference line Lc in direction Y, of each even pair P of the plurality of the pairs. For the convenience of description, in FIG. 11, each light emitting element E belonging to the second light emitting line LE2 is denoted by a white circle. Each light emitting element E belonging to one light emitting line LE between the first light emitting line LE1 and the second light emitting line LE is selectively driven by each driver unit 40.

According to this embodiment, the light emitting elements E belonging to the first light emitting line LE1 and the light emitting elements E belonging to the second light emitting line LE2 are disposed to be distributed in direction Y. Accordingly, the form of each exposure spot formed by the first light emitting line LE1 and the form of each exposure spot formed by the second light emitting line LE2 can be uniform. In addition, it may be configured such that a total of distances between the light emitting elements E, for example, belonging to the first light emitting line LE1 and the reference line Lc in direction Y and a total of distances between the second light emitting elements E belonging to the second light emitting line LE2 and the reference line Lc in direction Y are the same.

In addition, according to this embodiment, the light emitting elements E belonging to each light emitting line LE are disposed in a zigzag pattern of six rows, and accordingly, a high-definition image (latent image) formed on the image carrier by the light emitting device 10 can be acquired.

MODIFIED EXAMPLES

The invention is not limited to the above-described embodiments, and, for example, changes in the form as below can be made therein. In addition, two or more modified examples among modified examples represented below can be combined.

Modified Example 1

Figure 12:
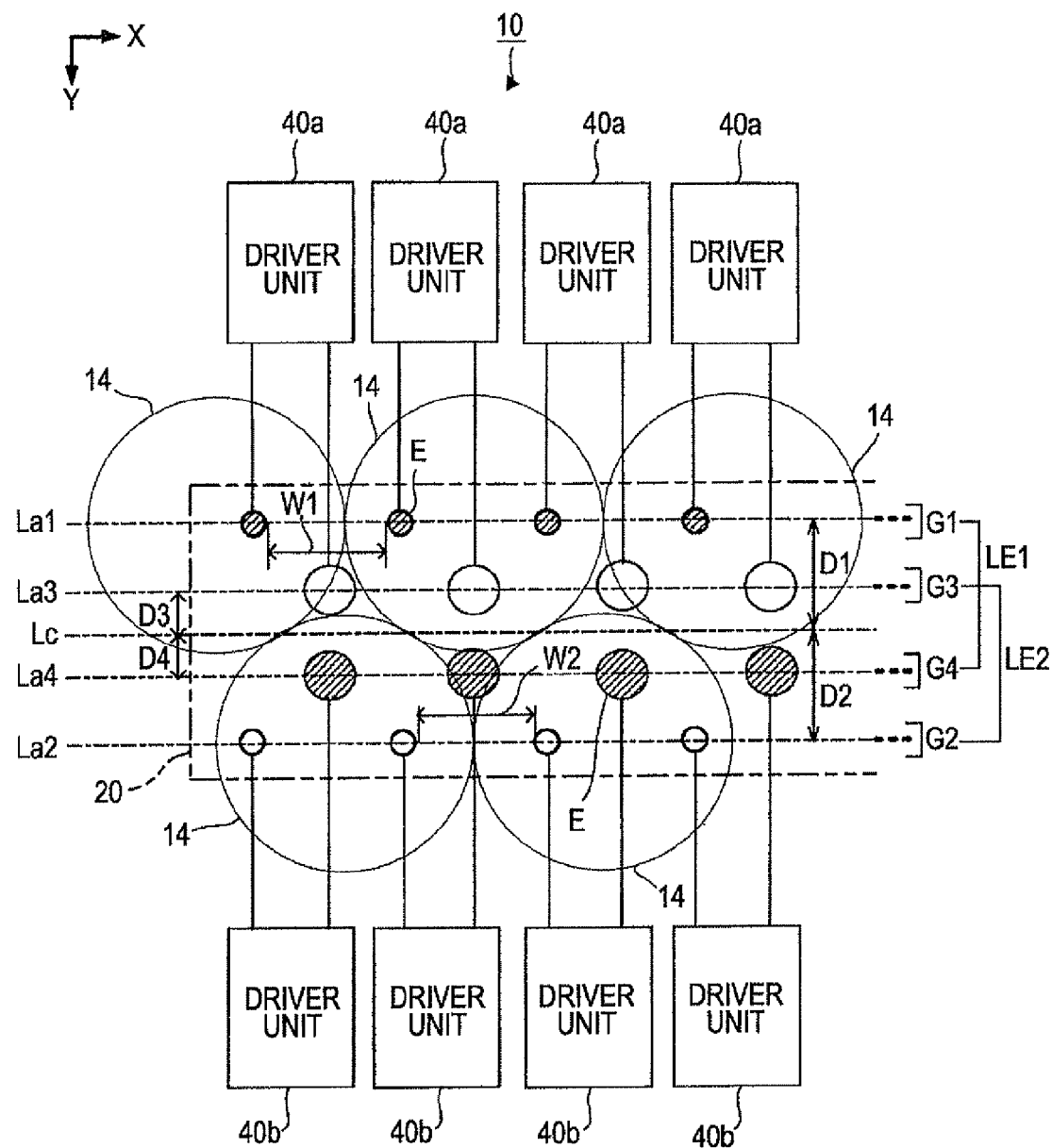
FIG. 12 is a plan view of a light emitting device according to a modified example of the invention.

In the above-described fourth embodiment, the sizes of the light emitting elements E belonging to each light emitting line LE are the same. However, the invention is not limited thereto. Thus, for example, as shown in FIG. 12, a form in which a light emitting element E, from which the distance to the reference line Lc in direction Y is longer, between each two light emitting elements connected to a same driver unit 40 is configured to have a size smaller than that of the other light emitting element E may be used. Described in more details, in the light emitting elements E of the element group G1 and the light emitting elements E of the element group G3 which are connected to the first driver units 40*a*, a distance D1 between the center of the light emitting element E of the element group G1 and the reference line Lc in direction Y is longer than a distance D3 between the center of the light emitting element E of the element group G3 and the reference line Lc in direction Y. Thus, the size of each light emitting element E of the element group G1 is configured to be smaller than that of each light emitting element E of the element group G3. Accordingly, a width W1 for passing a wiring extending from the first driver unit 40*a* to the light emitting element E belonging to the element group G3 can be sufficiently acquired between the light emitting elements E belonging to the element group G1.

Similarly, by configuring the size of the light emitting elements E of the element group G2 to be smaller than the size of the light emitting elements E of the element group G4, a width W2 for passing a wiring extending from the second driver unit 40*b* to the light emitting element E belonging to the element group G4 can be sufficiently acquired between the light emitting elements E belonging to the element group G2.

In addition, according to the configuration shown in FIG. 12, even when the pitch Pa between each light emitting elements E is shortened, a space of a wiring extending from each driver unit 40 to the light emitting element E belonging to a corresponding element group G can be acquired, and accordingly, the configuration can be effectively used for forming a high definition image.

In addition, in the configuration shown in FIG. 12, as in the above-described third embodiment, a form, in which the first light emitting line LE1 is configured by the element group G1 and the element group C2 and the second light emitting line LE2 is configured by the element group C3 and the element group G4, may be used. In addition, one light emitting line LE between the first light emitting line LE1 and the second light emitting line LE2 is selected in accordance with the use mode may be used.

Modified Example 2

Figure 13:
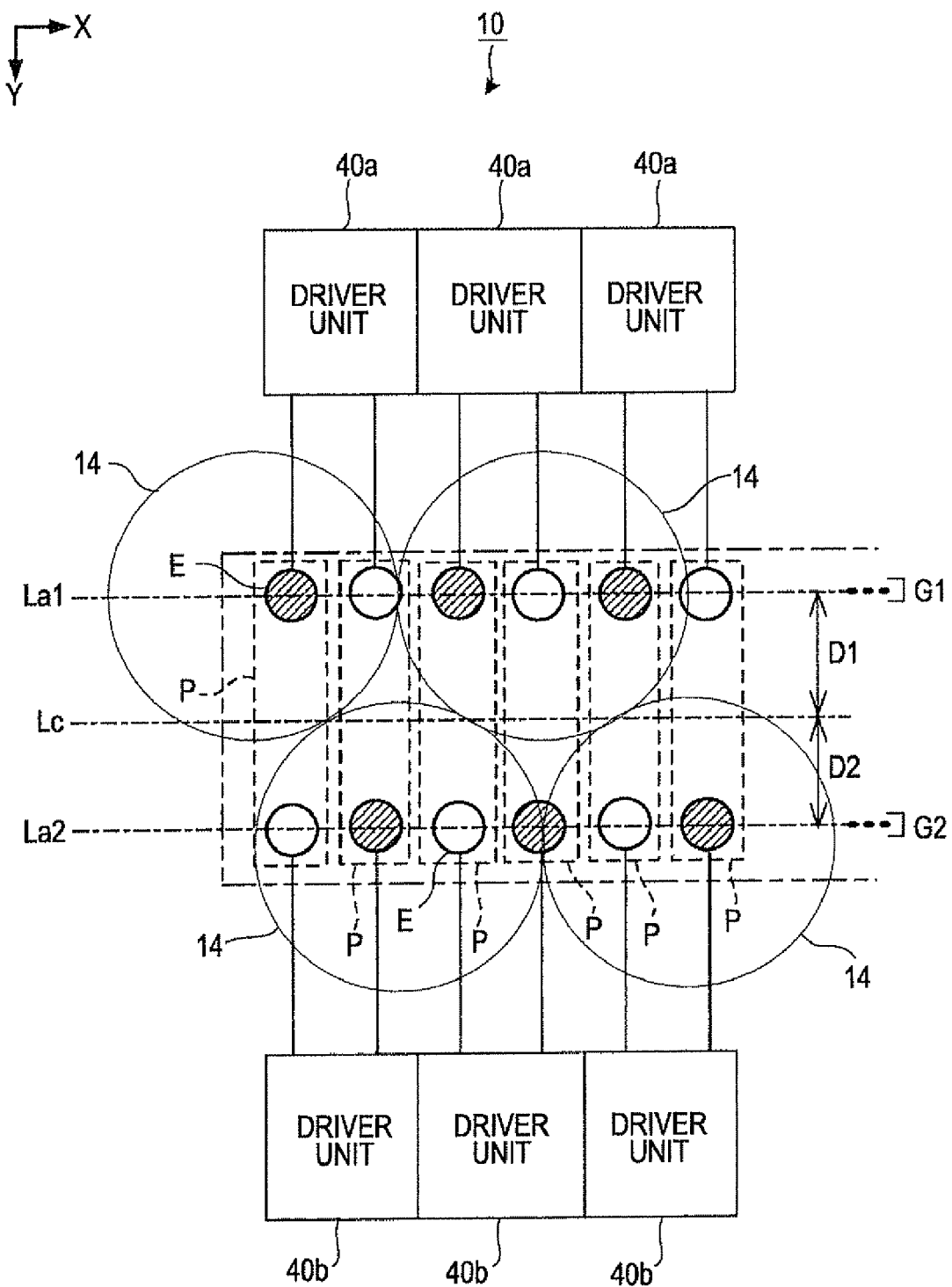
FIG. 13 is a plan view of a light emitting device according to another modified example of the invention.

According to the above-described fifth embodiment, the light emitting unit 20 is configured to include the element groups G (G1, G2, G3, G4, G5, and G6) of six rows that are disposed in parallel with one another in direction Y (the sub scanning direction) that intersects direction X. However, the invention is not limited thereto. Thus, for example, as shown in FIG. 13, a form in which the light emitting unit 20 includes the element groups G (G1 and G2) of two rows disposed in parallel with one another in direction Y may be used. In the configuration shown in FIG. 13, as in the first embodiment, a distance D1 between the reference line Lc and the center of the light emitting element E belonging to the element group G1 in direction Y is the same as a distance D2 between the reference line Lc and the center of the light emitting element E belonging to the element group G2 in direction Y, and the position of each light emitting element E belonging to the element group G1 and each light emitting element E belonging to the element group G2 in direction X are the same. The other configurations are the same as those of the fifth embodiment.

For example, a form in which a plurality of pairs P of the first light emitting element E (belonging to the first light emitting line LE1) and the second light emitting element E (belonging to the second light emitting line LE2) that are disposed with a predetermined gap interposed therebetween in direction Y is disposed in direction X, the first light emitting element E is disposed on one side of the reference line Lc in direction Y and the second light emitting element E is disposed on the other side in each odd pair P of the plurality of pairs P, and the first light emitting element E is disposed on the other side of the reference line Lc in direction Y and the second light emitting element E is disposed on the one side in each even pair P of the plurality of pairs P is preferable. In addition, as in the fifth embodiment, a form in which the positions of the light emitting elements E in direction Y of the pairs P that are adjacent in direction X are different from each other may be used. Alternatively, as the configuration shown in FIG. 13, a form in which the positions of the first light emitting element E and the second light emitting element E of the pairs P, which are adjacent in direction X, in direction Y are the same may be used.

Modified Example 3

In the above-described first embodiment of the invention, a form in which the center of each light emitting element belonging to the element group G1 is located on the line La1 that passes through the center of each lens 14 of the first lens group L1 and the center of each light emitting element belonging to the element group G2 is located on the line La2 that passes through the center of each lens 14 of the second lens group L2 is used. However, the invention is not limited thereto. Thus, for example, a form in which the light emitting elements E belonging to the element group G1 are not disposed on the line La1 and the light emitting elements E belonging to the element group G2 are not disposed on the line La2 may be used. In order to suppress the deviation between imaged bodies formed for a case where the first light emitting line LE1 emits light and a case where the second light emitting line LE2 emits light, it is preferable that a distance D1 between the reference line Lc and each light emitting element E belonging to the element group G1 in direction Y and a distance D2 between the reference line Lc and each light emitting element E belonging to the element group G2 in direction Y are configured to be same. Similarly, in the second embodiment, a form in which the light emitting elements E belonging to the element group G1 are not disposed on the line La1 and the light emitting elements E belonging to the element group G2 are not disposed on the line La2 may be used.

Modified Example 4

In the above-described embodiments, as an example of the light emitting element E, an OLED element is used. However, as the light emitting element, an inorganic light emitting diode or an LED (Light Emitting Diode) may be used. The key point is that any element may be used as long as the element emits light at an emission luminance level corresponding to a driving current.

Modified Example 5

Figure 14:
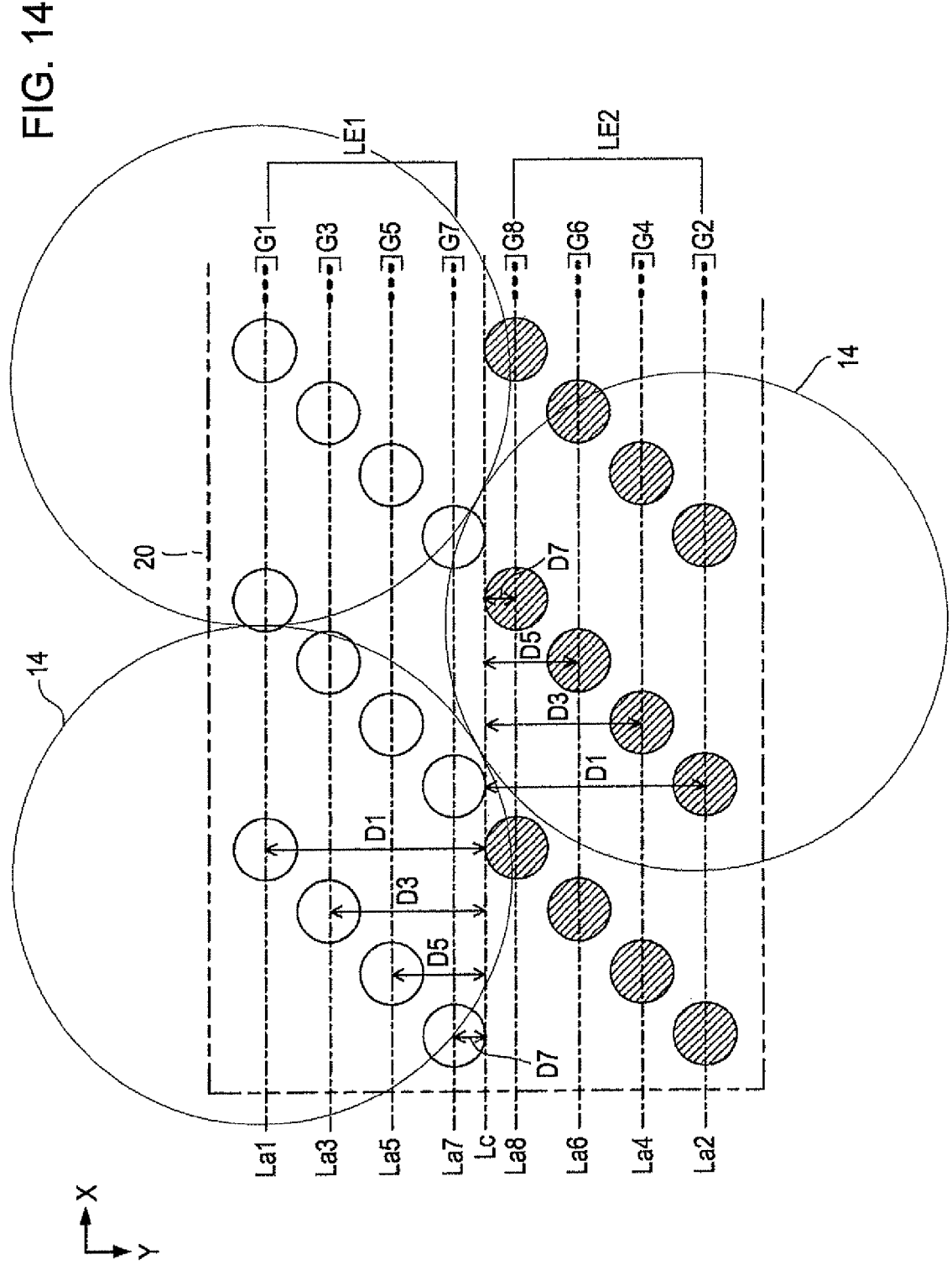
FIG. 14 is a plan view of a light emitting device according to another modified example of the invention.

The number of rows of the element groups G disposed in the light emitting unit 20 may be is an arbitrary value. For example, as shown in FIG. 14, a configuration in which element groups G (G1, G2, G3, G4, G5, G6, G7, and G8) of eight rows are disposed in the light emitting unit 20 may be used. In FIG. 14, the element groups G1, G3, G5, and G7 are disposed on the negative side of direction Y, viewed from the reference line Lc and configure the first light emitting line LE1, and the element groups G2, G4, G6, and G8 are disposed on the positive side of direction Y, viewed from the reference line Lc and configure the second light emitting line LE2. As shown in FIG. 14, a distance between the reference line Lc and the center of the light emitting element E belonging to the element group G1 in direction Y is the same as a distance between the reference line Lc and the center of the light emitting element E belonging to the element group G2 in direction Y and has a value D1. In addition, a distance between the reference line Lc and the center of the light emitting element E belonging to the element group G3 in direction Y is the same as a distance between the reference line Lc and the center of the light emitting element E belonging to the element group G4 in direction Y and has a value of D3. In addition, a distance between the reference line Lc and the center of the light emitting element E belonging to the element group G5 in direction Y is the same as a distance between the reference line Lc and the center of the light emitting element E belonging to the element group G6 and has a value of D5. In addition, a distance between the reference line Lc and the center of the light emitting element E belonging to the element group C7 in direction Y is the same as a distance between the reference line Lc and the center of the light emitting element E belonging to the element group G8 in direction Y and has a value of D7.

Figure 15:
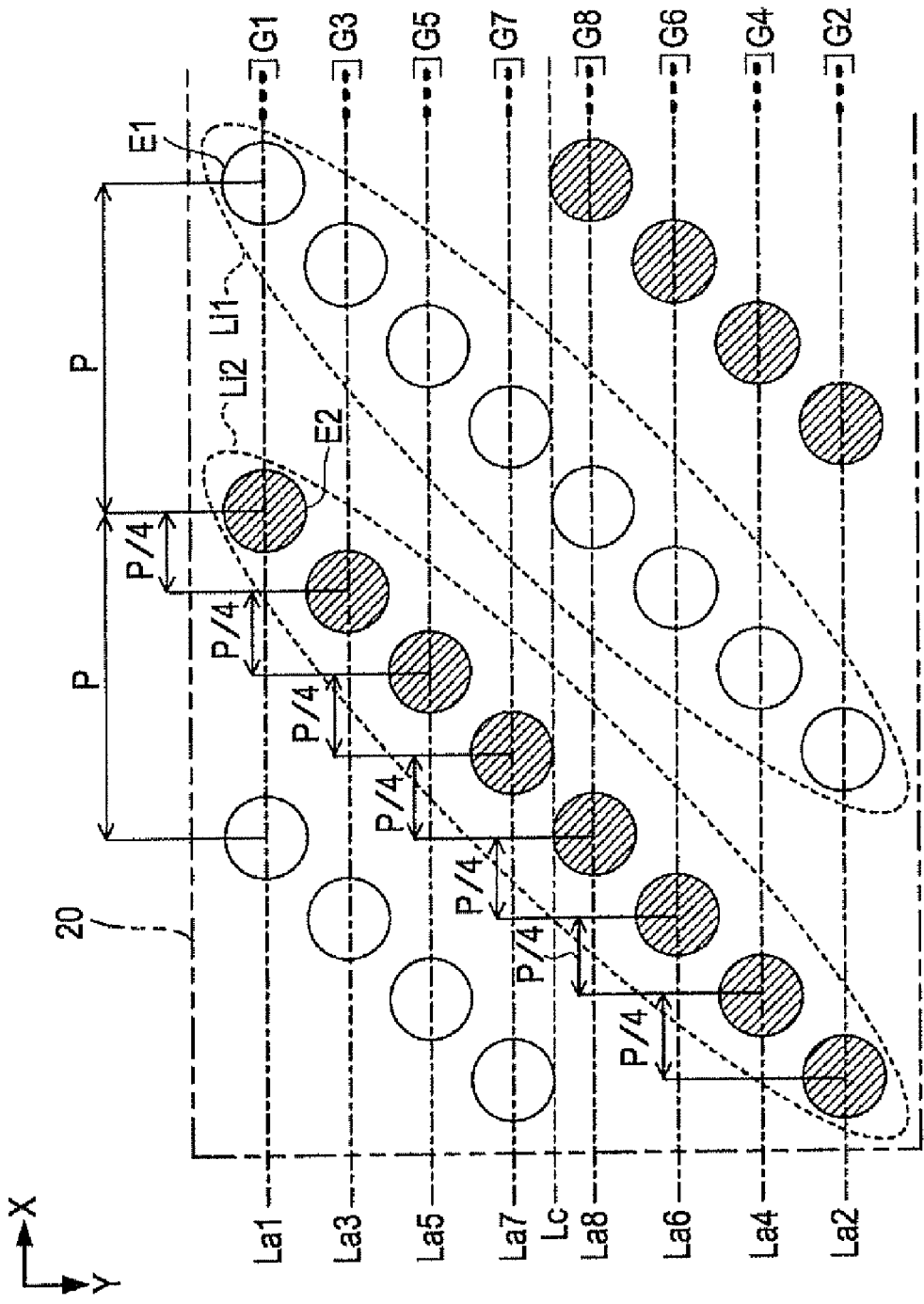
FIG. 15 is a plan view of a light emitting device according to another modified example of the invention.

In addition, as shown in FIG. 15, a form in which the element groups G (G1, G2, G3, G4, G5, G6, G7, and G8) of eight rows are disposed in the light emitting unit 20 and each element group G is configured by alternately disposing a first light emitting element E1 (a light emitting element denoted by a white circle shown in FIG. 15) belonging to the first light emitting line LE1 and a second light emitting element E2 (a light emitting element denoted by a dashed circle in FIG. 15) belonging to the second light emitting line LE2 may be used. In FIG. 15, each of the element groups G1 to G8 is a set of n light emitting elements E that are disposed in the pitch P in direction X. As shown in FIG. 15, the element groups G are disposed to be deviated by P/4 in direction X. In the configuration shown in FIG. 15, one unit row Li1 is configured by disposing first light emitting elements E1 of the element groups G to be deviated by P/4 in direction X, and one unit row Li2 is configured by disposing second light emitting elements E2 of the element groups G to be deviated by P/4 in direction X. In addition, the unit row Li1 and the unit row Li2 are alternately disposed in direction X. In addition, although the lenses 14 are not shown in FIG. 15, the form of the lenses 14 is the same as the configuration shown in FIG. 14.

Figure 16:
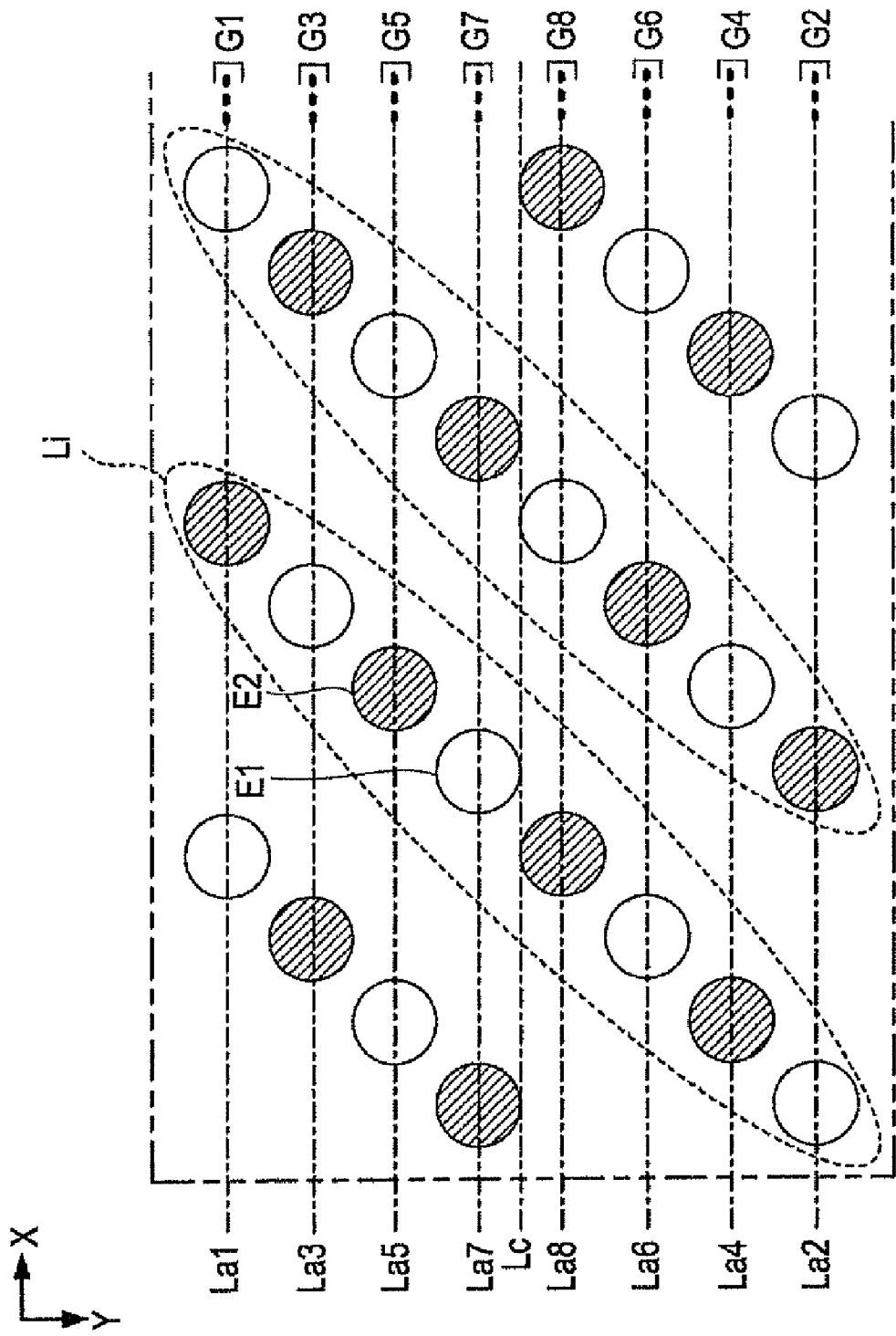
FIG. 16 is a plan view of a light emitting device according to another modified example of the invention.

In FIG. 15, eight light emitting elements configuring one unit row Li are configured by one between the first light emitting elements E1 and the second light emitting elements E2. However, for example, as shown in FIG. 16, a form in which one unit row Li is configured by alternately disposing the first light emitting element E1 and the second light emitting element E2 may be used.

Electronic Apparatus

Next, an image forming apparatus as a form of an electronic apparatus according to an embodiment of the invention will be described with reference to FIG. 14. The image forming apparatus is a full-color image forming apparatus of a tandem type using a belt intermediate transfer body.

In this image forming apparatus, four light emitting devices 10K, 10C, 10M, and 10Y having a same configuration are disposed in positions for facing imaging surfaces 110 of four photosensitive drums 110K, 110C, 110M and 110Y (image carriers) having a same configuration. The light emitting devices 10K, 10C, 10M, and 10Y have a same configuration as that of the light emitting device 10 according to each of the above-described embodiments.

Figure 17:
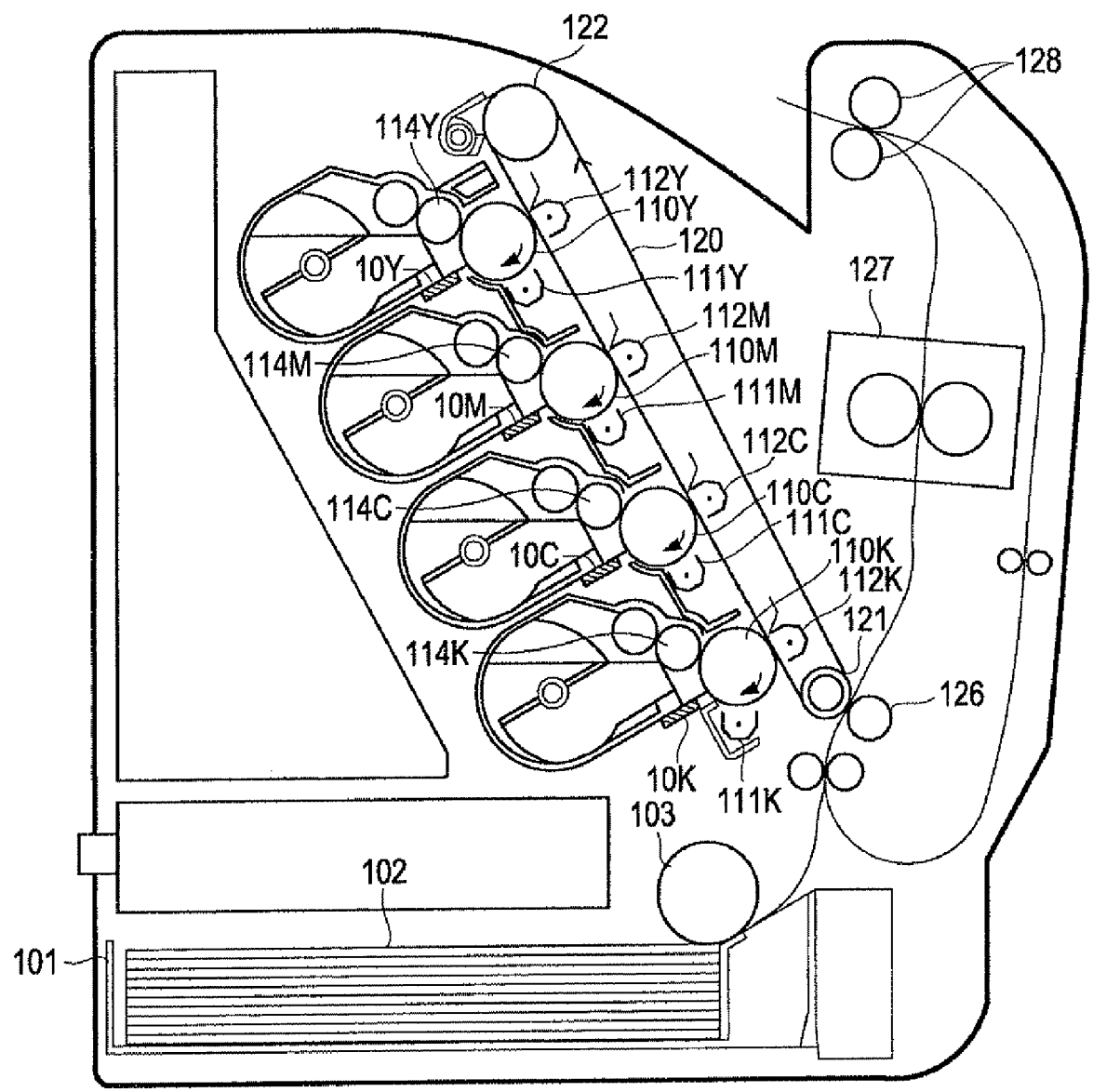
FIG. 17 is a perspective view showing a detailed example (image forming apparatus) of an electronic apparatus according to an embodiment of the invention.

As shown in FIG. 17, in this image forming apparatus, a driving roller 121 and a driven roller 122 are disposed. The rollers 121 and 122 are wound by an endless intermediate transfer belt 120, and the intermediate transfer belt is rotated around the rollers 121 and 122 as denoted by arrows. Although not shown in the figure, a tension unit such as a tension roller that applies tension to the intermediate transfer belt 120 may be disposed.

Near the intermediate transfer belt 120, four photosensitive drums 110K, 110C, 110M, and 110Y that have photosensitive layers on the outer peripheral faces thereof are disposed with a predetermined gap interposed therebetween. Here, suffixes "K", "C", "M", and "Y" represent that the photosensitive drums are used for forming actual images of a black color, a cyan color, a magenta color, and a yellow color. This applies to other members. The photosensitive drums 110K, 110C, 110M, and 110Y are driven to rotate in synchronization with driving of the intermediate belt 120.

Near each photosensitive drum 110 (K, C, M, and Y), a corona charger 111 (K, C, M, and Y), a light emitting device 10 (K, C, M, and Y), and a developing device 114 (K, C, M, and Y) are disposed. The corona charger 111 (K, C, M, and Y) uniformly charges an imaging surface 110A (outer peripheral face) of the photosensitive drum 110 (K, C, M, and Y) corresponding thereto. The light emitting device 10 (K, C, M, and Y) writes an electrostatic latent image on the charged imaging surface 110A of each photosensitive drum. In each light emitting device 10 (K, C, M, and Y), a plurality of light emitting elements 20 is arranged along the bus line (main scanning direction) of the photosensitive drum 110 (K, C, M, and Y). An operation for writing the electrostatic latent image is performed by projecting light onto the photosensitive drum 110 (K, C, M, and Y) by using the plurality of light emitting elements 20. The developing device 114 (K, C, M, and Y) forms an actual image (that is, a visible image) on the photosensitive drum 110 (K, C, M, and Y) by adhering toner as a developer to the electrostatic latent image.

The actual images of a black color, a cyan color, a magenta color, and a yellow color that are formed by monochrome actual image forming stations of four colors are sequentially transferred on the intermediate transfer belt 120 as a primary transfer process to be overlapped with one another on the intermediate transfer belt 120, and thereby a full-color actual image is formed. On the inner side of the intermediate transfer belt 120, four primary-transfer corotrons (transfer units) 112 (K, C, M, and Y) are disposed. The primary transfer corotrons 112 (K, C, M, and Y) are disposed near the photosensitive drums 110 (K, C, M, and Y). As the primary transfer corotrons electrostatically suck the actual images from the photosensitive drums 110 (K, C, M, and Y), the actual images are transferred onto the intermediate transfer belt 120 that passes between the photosensitive drums and the primary-transfer corotrons.

Then, a sheet 102 as a target (recording material) for forming a final image is fed from a paper feeding cassette 101 by a pickup roller 103 one after another and is transported in a nip formed between the intermediate transfer belt 120 that is brought into contact with the driving roller 121 and a secondary transfer roller 126. The full-color actual image formed on the intermediate transfer belt 120 is transferred altogether onto one face of the sheet 102 by the secondary transfer roller 126 as a secondary transfer process and is fixed to the sheet 102 by being passed through a fixing roller pair 127 as a fixing unit. Thereafter, the sheet 102 is discharged to a discharge cassette that is formed on the upper part of the device by a discharge roller pair 128.

Figure 18:
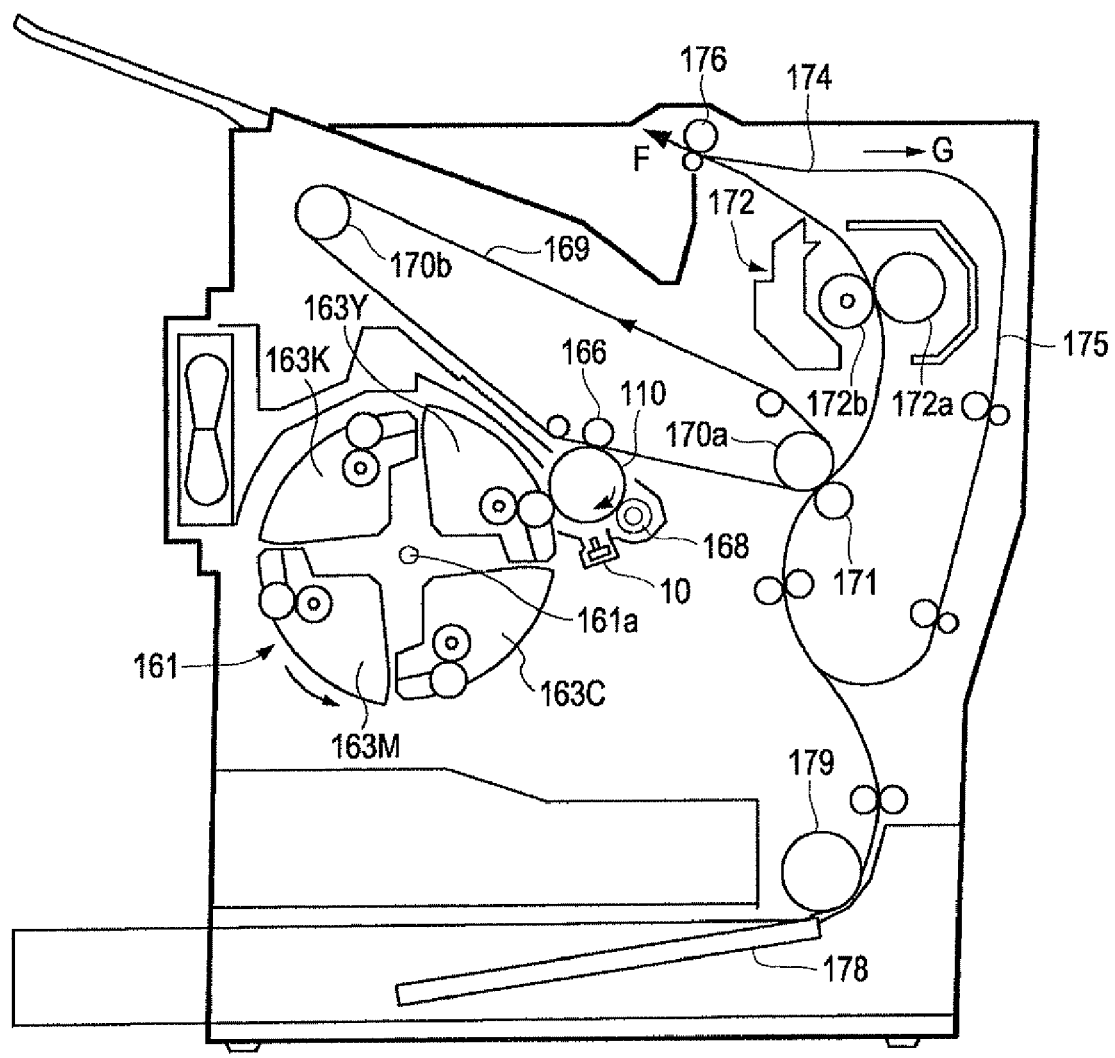
FIG. 18 is a perspective view showing a detailed example (image forming apparatus) of an electronic apparatus according to another embodiment of the invention.

Next, an image forming apparatus according to another embodiment of the invention will be described with reference to FIG. 18. This image forming apparatus is a full-color image forming apparatus of a rotary developing type using a belt intermediate transfer body. As shown in FIG. 18, near a photosensitive drum 110, a corona charger 168, a rotary-type developing unit 161, the light emitting device 10 according to the above-described embodiment, and an intermediate transfer belt 169 are disposed.

The corona charger 168 uniformly charges the outer peripheral face of the photosensitive drum 110. The light emitting device 10 writes an electrostatic latent image onto the charged imaging surface (outer peripheral face) of the photosensitive drum 110. In the light emitting device 10, a plurality of light emitting elements 32 is arranged along the bus line (main scanning direction) of the photosensitive drum 110. The operation for writing the electrostatic latent image is performed by projecting light from the light emitting elements 32 to the photosensitive drum 110.

The developing unit 161 is a drum in which four developing units 163Y, 163C, 163M, and 163K are disposed with an interval of 90° therebetween. The developing unit can be rotated around an axis 161a in the counterclockwise direction. The developing units 163Y, 163C, 163M, and 163K supply toner of a yellow color, a cyan color, a magenta color, and a black color to the photosensitive drum 110, and by adhering toner as a developer to the electrostatic latent image, an actual image (that is, a visible image) is formed on the photosensitive drum 110.

An endless intermediate transfer belt 169 is wound around a driving roller 170a, a driven roller 170b, a primary transfer roller 166, and a tension roller and is rotated around the rollers in the direction denoted by an arrow. The primary transfer roller 166 electrostatically sucks the actual image from the photosensitive drum 110 for transferring the actual image onto the intermediate transfer belt 169 that passes through the photosensitive drum 110 and the primary transfer roller 166.

In particular, by the first rotation of the photosensitive drum 110, an electrostatic latent image for a yellow (Y) image is written by the light emitting device 10, and an actual image of a same color is formed by the developing unit 163Y and then, is transferred onto the intermediate transfer belt 169. In addition, by the next rotation, an electrostatic latent image for a cyan (C) image is written by the light emitting device 10A, and an actual image of a same color is formed by the developing unit 163C. Then, the actual image is transferred onto the intermediate transfer belt 169 to be overlapped with the yellow actual image. Then, while the photosensitive drum 110 is rotated four times as described above, the actual images of yellow, cyan, magenta, and black are sequentially overlapped with one another on the intermediate transfer belt 169. As a result, a full-color actual image is formed on the transfer belt 169. When an image is formed on both sides of one sheet as a final target for forming an image, actual images of a same color are transferred to the front and rear surfaces of the intermediate transfer belt 169, and then, actual images of the next color are transferred onto the front and rear surfaces of the intermediate transfer belt 169. Thereby a full-color actual image is formed on the intermediate transfer belt 169.

In the image forming apparatus, a sheet transport path 174 through which a sheet passes is installed. The sheets are picked up from a paper feeding cassette 178 by a pickup roller 179 one after another, is advanced through the sheet transport path 174 by the transport roller, and passes a nip formed between the intermediate transfer belt 169 that is brought into contact with the driving roller 170a and the secondary transfer roller 171. The second transfer roller 171 transfers the actual image on one surface of the sheet by electrostatically sucking the full-color actual image altogether from the intermediate transfer belt 169. The secondary transfer roller 171 is configured to approach or depart from the intermediate transfer belt 169 by using a clutch not shown in the figure. Then, when the full-color actual image is transferred onto the sheet, the secondary transfer roller 171 is brought into contact with the intermediate transfer belt 169. On the other hand, the secondary transfer roller 171 is departed from the secondary transfer belt 169 while actual images are repeatedly transferred on the intermediate transfer belt 169.

As described above, the sheet on which the actual image is transferred is transported to the fixing unit 172, and by passing the sheet between a heating roller 172a and a pressure roller 172b of the fixing unit 172, the actual image on the sheet is fixed. The sheet after the fixing process is drawn into a discharge roller pair 176 so as to be advanced in the direction of arrow F. For a case where a double-sided printing process is performed, after most of the sheet passes the discharge roller pair 176, the discharge roller pair 176 is rotated in the opposite direction. Accordingly, the sheet is introduced into a transport path 175 for the double-sided printing process as denoted by arrow G. Then, the actual image is transferred onto the other surface of the sheet by the secondary transfer roller 171. After the fixing process is performed for the sheet by using the fixing unit 172 again, the sheet is discharged to the discharge roller pair 176.

The image forming apparatuses shown in FIGS. 14 and 15 as examples use a light source (exposure unit) that employs an OLED element as the light emitting element 20, and accordingly, the apparatuses can be miniaturized, compared to a case where a laser scanning optical system is used. In addition, the light emitting device 10 according to an embodiment of the invention can be employed in an image forming apparatus of a xerographic type. For example, the light emitting device 10 according to an embodiment of the invention can be applied to an image forming apparatus in which an actual image is directly transferred to a sheet from the photosensitive drum without using an intermediate transfer belt or an image forming apparatus that forms a monochrome image.

The use of the light emitting device according to an embodiment of the invention is not limited to exposure of the photosensitive body. For example, the light emitting device according to an embodiment of the invention is employed in an image-reading device such as a scanner as a line-type optical head (luminance device) that projects light onto a reading target such as a document. As image reading apparatuses of this type, there are a scanner, a reading part of a copier or a fax machine, a bar-code reader, and a two-dimensional image code reader that reads a two-dimensional code that is the same as a QR code (registered trademark). In addition, the light emitting device in which a plurality of light emitting elements (particularly, light emitting elements) is disposed on a face thereof can be used as a back light unit that is disposed on the rear side of a liquid crystal panel. In addition, the light emitting device in which a plurality of light emitting elements is arranged in a matrix shape can be used as a display unit of various electronic apparatuses.

The entire disclosure of Japanese Patent Application Nos: 2007-316656, filed Dec. 7, 2007 and 2008-279324, filed Oct. 30, 2008 are expressly incorporated by reference herein.

What is claimed is:

1. A light emitting device comprising:
    a plurality of light emitting elements aligned along a reference line;
    a plurality of lenses that collects light emitted from the plurality of light emitting elements; and
    a drive circuit that allows either a first light emitting element or a second light emitting element to emit light,
    wherein the plurality of lenses includes:
    a first lens; and
    a second lens that is disposed on an opposite side of the first lens with the reference line interposed therebetween,
    wherein a distance between the center of the first lens and the reference line is the same as a distance between the center of the second lens and the reference line,
    wherein the plurality of light emitting elements includes:
    the first light emitting element;
    the second light emitting element that is disposed on an opposite side of the first light emitting element with the reference line interposed therebetween;
    a third light emitting element disposed on a side that is the same as that of the first light emitting element, viewed from the reference line; and
    a fourth light emitting element disposed on a side that is the same as that of the second light emitting element, viewed from the reference line,
        wherein a center of the third light emitting element is shifted in a direction in which the reference line extends from a center of the first light emitting element, wherein a center of the fourth light emitting element is shifted in the direction in which the reference line extends from a center of the second light emitting element, wherein a distance between the first light emitting element and the reference line is the same as a distance between the second light emitting element and the reference line, wherein a distance between the reference line and the third light emitting element is the same as a distance between the reference line and the fourth light emitting element and the distance between the third light emitting element and the reference line is different than the distance between the reference line and the first light emitting element, wherein the drive circuit allows the light emitting elements belonging to one light emitting line between a first light emitting line including the first light emitting element and the third light emitting element and a second light emitting line including the second light emitting element and the fourth light emitting element to emit light, wherein the light emitting elements belonging to the first light emitting line are disposed in a zigzag pattern, and wherein the light emitting elements belonging to the second light emitting line are disposed in a zigzag pattern.

2. An electronic apparatus comprising the light emitting device according to claim 1.

3. A light emitting device comprising:
a plurality of light emitting elements aligned along a reference line; and
a plurality of lenses that collects light emitted from the plurality of light emitting elements,
wherein the plurality of lenses includes:
a first lens; and
a second lens that is disposed on an opposite side of the first lens with the reference line interposed therebetween,
wherein a distance between the center of the first lens and the reference line is the same as a distance between the center of the second lens and the reference line,
wherein the plurality of light emitting elements includes:
a first light emitting element;
a second light emitting element that is disposed on an opposite side of the first light emitting element with the reference line interposed therebetween;
a third light emitting element that is disposed on a side that is the same as that of the first light emitting element, viewed from the reference line; and
a fourth light emitting element that is disposed on a side that is the same as that of the second light emitting element, viewed from the reference line,
wherein the first light emitting element and the third light emitting element are disposed on a side that is the same as that of the first lens, viewed from the reference line,
wherein the second light emitting element and the fourth light emitting element are disposed on a side that is the same as that of the second lens, viewed from the reference line,
wherein a center of the second light emitting element is shifted in a direction in which the reference line extends from a center of the first light emitting element,
wherein a center of the fourth light emitting element is shifted in the direction in which the reference line extends from a center of the third light emitting element,
wherein a distance between the reference line and the first light emitting element is the same as a distance between the reference line and the second light emitting element,
wherein the first light emitting element is disposed in a position that is closer to a first line passing though the center of the first lens and extending along the reference line than the third light emitting element, wherein the second light emitting element is disposed in a position that is closer to a second line passing though the center of the second lens and extending along the reference line than the fourth light emitting element, wherein a drive circuit allows the light emitting elements belonging to one light emitting line between a first light emitting line including the first light emitting element and the second light emitting element and a second light emitting line including the third light emitting element and the fourth light emitting element to emit light, wherein the light emitting elements belonging to the first light emitting line are disposed in a zigzag pattern, and wherein the light emitting elements belonging to the second light emitting line are disposed in a zigzag pattern.

4. A light emitting device in which a plurality of pairs each including a first light emitting element and a second light emitting element that are disposed in a second direction that is different from a first direction with a predetermined gap interposed therebetween is disposed in the first direction, the light emitting device comprising a drive circuit that allows light emitting elements belonging to either a first light emitting line including the first light emitting element of each of the plurality of pairs or a second light emitting line including the second light emitting element of each of the plurality of pairs to emit light, wherein a first lens group and a second lens group that respectively include a plurality of lenses that is disposed in the first direction and collects light emitted from the light emitting elements are disposed in parallel with each other in the second direction, wherein, in each odd pair of the plurality of pairs, the first light emitting element is disposed on one side of the second direction and the second light emitting element is disposed on the other side, viewed from a reference line that has a same distance from a first line that passes through the center of each lens of the first lens group and extends in the first direction and from a second line that passes through the center of each lens of the second lens group and extends in the first direction in the second direction, wherein, in each even pair of the plurality of pairs, the first light emitting element is disposed on the other side of the second direction, viewed from the reference line, and the second light emitting element is disposed on the one side, wherein each adjacent first light emitting element and second light emitting element of each of the plurality of pairs is disposed on an opposite side of the reference line, wherein the light emitting elements belonging to the first light emitting line are disposed in a zigzag pattern, and wherein the light emitting elements belonging to the second light emitting line are disposed in a zigzag pattern.

5. The light emitting device according to claim 4,
wherein, in each of the plurality of pairs that are adjacent in the first direction, positions of the light emitting elements in the second direction are different from each other.

* * * * *